US011979004B2

(12) United States Patent
Lee

(10) Patent No.: US 11,979,004 B2
(45) Date of Patent: May 7, 2024

(54) PRODUCTION SUPPORT METHOD AND SYSTEM FOR POWER CONTROL PANEL PRODUCTION AUTOMATION

(71) Applicant: END ELECTRIC CO., LTD., Incheon (KR)

(72) Inventor: Jun Ho Lee, Incheon (KR)

(73) Assignee: END ELECTRIC CO., LTD., Incheon (KR)

( * ) Notice: Subject to any disclaimer, the term of this patent is extended or adjusted under 35 U.S.C. 154(b) by 0 days.

(21) Appl. No.: 18/277,983

(22) PCT Filed: Mar. 15, 2021

(86) PCT No.: PCT/KR2021/003132
§ 371 (c)(1),
(2) Date: Aug. 19, 2023

(87) PCT Pub. No.: WO2022/177057
PCT Pub. Date: Aug. 25, 2022

(65) Prior Publication Data
US 2024/0039251 A1    Feb. 1, 2024

(30) Foreign Application Priority Data
Feb. 19, 2021  (KR) .......................... 10-2021-0022593

(51) Int. Cl.
*H02B 1/00* (2006.01)
*G05B 19/4097* (2006.01)
*G06F 30/30* (2020.01)
*H01R 43/00* (2006.01)
*H02B 3/00* (2006.01)

(52) U.S. Cl.
CPC ........... *H02B 1/00* (2013.01); *G05B 19/4097* (2013.01); *G06F 30/30* (2020.01); *H01R 43/00* (2013.01);
(Continued)

(58) Field of Classification Search
CPC .. H02B 1/00; H02B 3/00; G06F 30/30; G05B 19/4097; H01R 43/00; H01H 2229/022
(Continued)

(56) References Cited

U.S. PATENT DOCUMENTS 7,478,352 B2 *  1/2009  Chaplin .................. G06F 30/15
                                                    716/139
2008/0120086 A1 *  5/2008  Lilley ..................... G06T 19/20
                                                    703/21
(Continued)

FOREIGN PATENT DOCUMENTS

JP    2015-032134 A    2/2015
JP    2018-081693 A    5/2018
(Continued)

OTHER PUBLICATIONS

International Search Report for PCT/KR2021/003132 dated Nov. 16, 2021 from Korean Intellectual Property Office.
(Continued)

*Primary Examiner* — Suresh Memula
(74) *Attorney, Agent, or Firm* — Revolution IP, PLLC

(57) ABSTRACT

The present invention proposes a production support method and system for power control panel production automation, which enable an intention of a designer to be sufficiently reflected on a production site and an error occurred during production to be minimized and, in particular, includes the steps of: realizing, in a virtual environment, a power control panel designed in a 3D type and verifying an error by simulating wiring path information of designed components and electronic units; extracting production data for each process, including component information for each process, component and electronic unit arrangement information, assembly process information, and wiring information, by collecting information distributed to support production automation of the power control panel designed in the 3D
(Continued)

type, which has been verified; and automating production by applying the production data to each interworking production facility to support the production automation of the power control panel.

7 Claims, 24 Drawing Sheets

(52) U.S. Cl.
CPC ......... *H02B 3/00* (2013.01); *H01H 2229/022* (2013.01)

(58) Field of Classification Search
USPC .......................................................... 703/14
See application file for complete search history.

(56) References Cited

U.S. PATENT DOCUMENTS

2016/0110482 A1* 4/2016 Gupte .................... G06F 30/00
703/1

2018/0136637 A1    5/2018  Bodanapu et al.
2023/0153485 A1*   5/2023  Austern ................ G06N 20/00
703/1

FOREIGN PATENT DOCUMENTS

KR          10-1931530 B1       3/2019
KR          102318512 B1  *    10/2021

OTHER PUBLICATIONS

Naver blog., "EPLAN ProPanel 3D Control Panel and Distribution Panel Design Solution for Design and Fabrication Integration", [online], Mar. 13, 2018, <https://blog.naver.com/emsolution2520/221227693665>.

Naver blog., "EPLAN Electric P8 Engineering Solutions for Electrical Design Standardization and Document Automation", [online], Mar. 10, 2018, <https://blog.naver.com/emsolution2520/221225850218>.

* cited by examiner

[Figure 1]
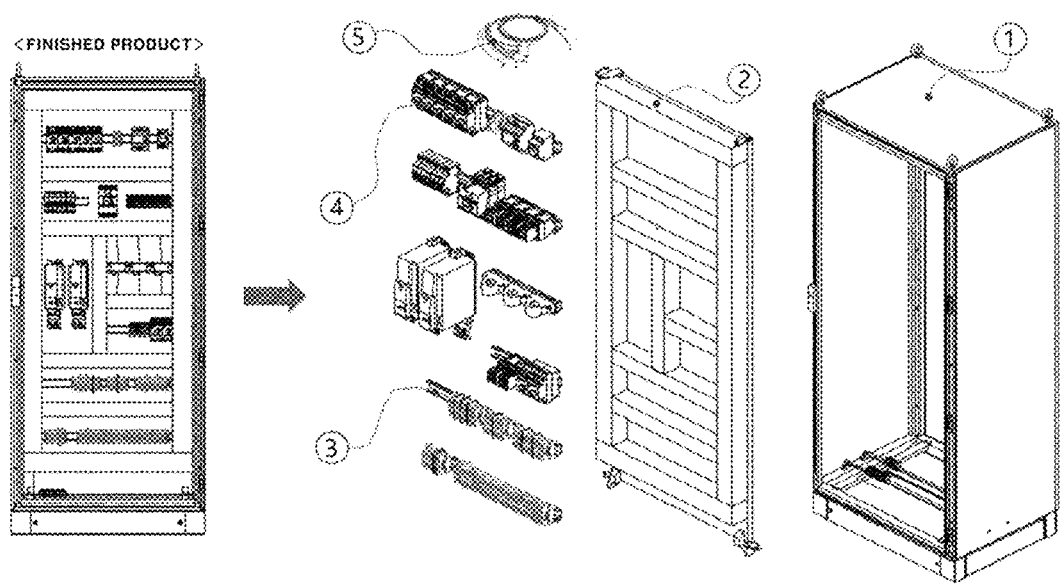

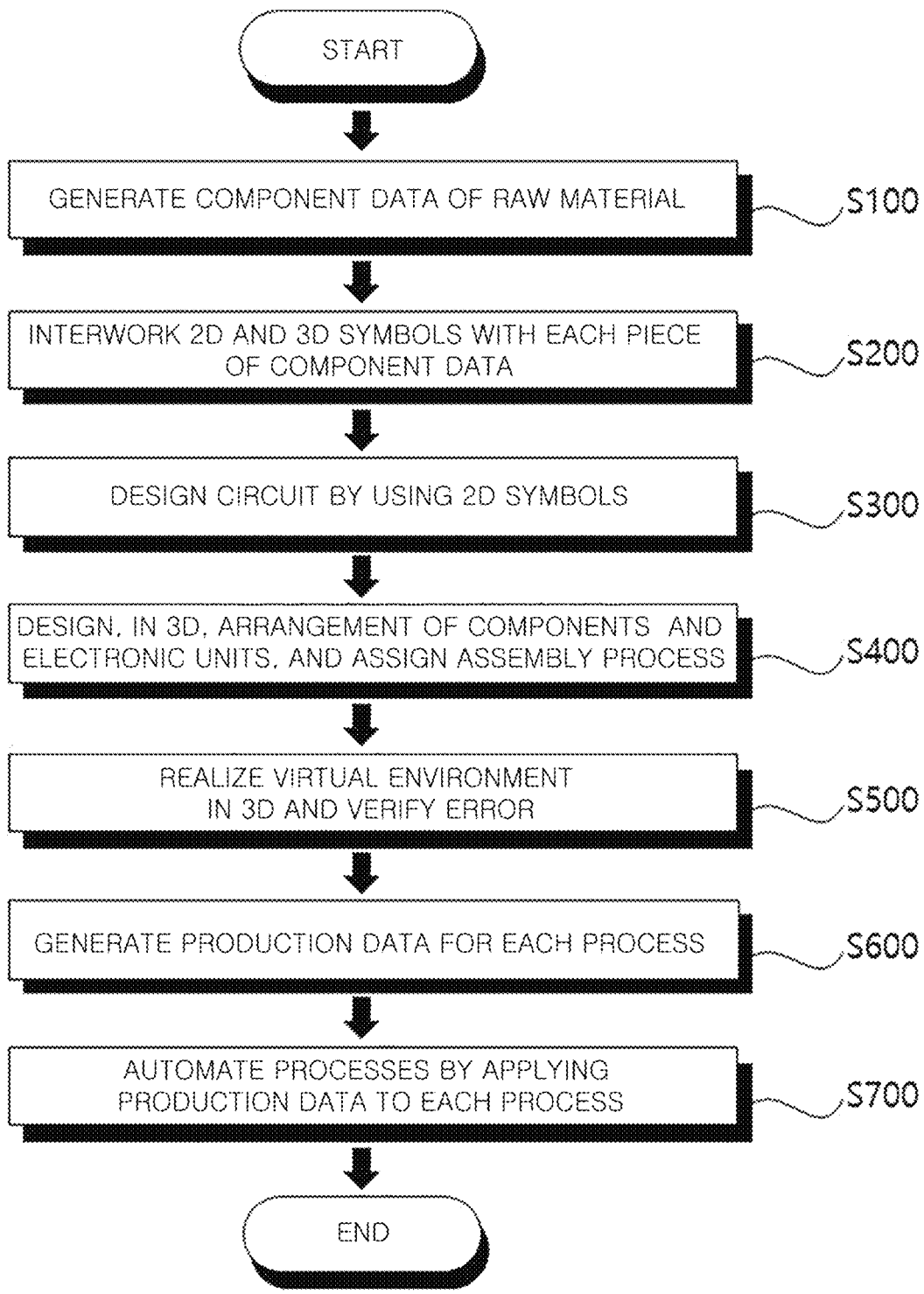

[Figure 3]
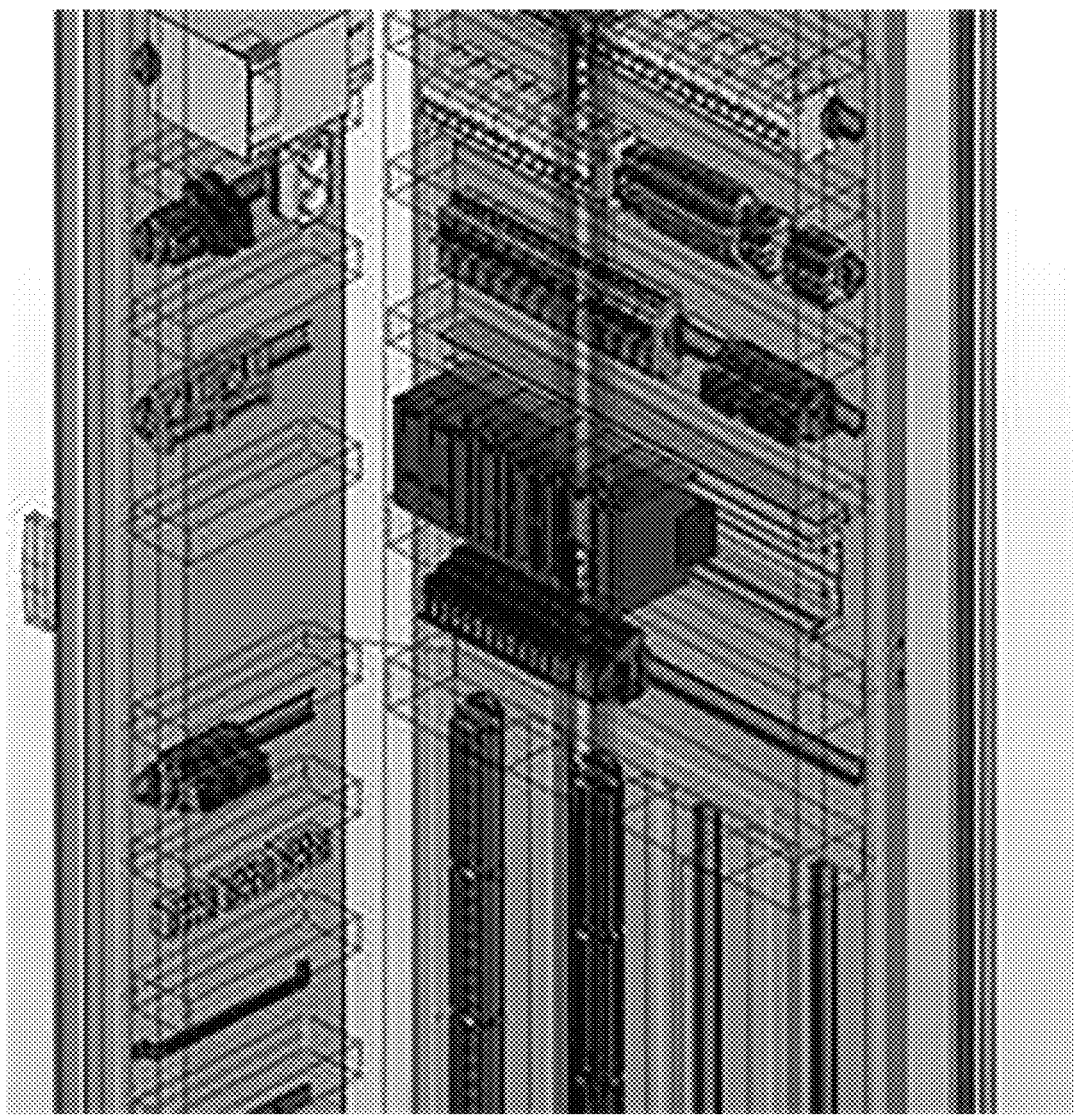

[Figure 4]
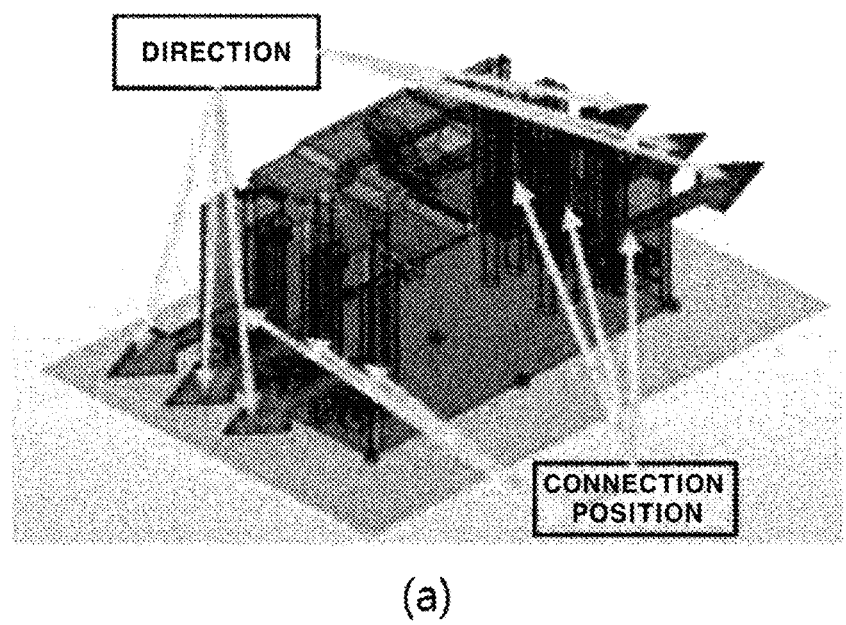
(a)
| CONNECTION POSITION NAME | WIRING CONNECTION POSITION | | | WIRING CONNECTION DIRECTION | | | |
|---|---|---|---|---|---|---|---|
| CONNECTION POINT DESIGNATION | X POSITION | Y POSITION | Z POSITION | ROUTING DIRECTION | X VECTOR | Y VECTOR | Z VECTOR |
| A1 | 16.00 mm | 70.50 mm | 63.60 mm | MOVE UP | 0 | 1 | 0 |
| A2 | 29.00 mm | 70.50 mm | 63.60 mm | MOVE UP | 0 | 1 | 0 |
| 13 | 7.50 mm | 59.00 mm | 86.90 mm | MOVE UP | 0 | 1 | 0 |
| 23 | 17.50 mm | 59.00 mm | 86.90 mm | MOVE UP | 0 | 1 | 0 |
| 33 | 27.50 mm | 59.00 mm | 86.90 mm | MOVE UP | 0 | 1 | 0 |
| 43 | 37.50 mm | 59.00 mm | 86.90 mm | MOVE UP | 0 | 1 | 0 |
| 14 | 7.50 mm | 15.00 mm | 86.90 mm | MOVE DOWN | 0 | -1 | 0 |
| 24 | 17.50 mm | 15.00 mm | 86.90 mm | MOVE DOWN | 0 | -1 | 0 |
| 34 | 27.50 mm | 15.00 mm | 86.90 mm | MOVE DOWN | 0 | -1 | 0 |
| 44 | 37.50 mm | 15.00 mm | 86.90 mm | MOVE DOWN | 0 | -1 | 0 |
(b)

[Figure 5]
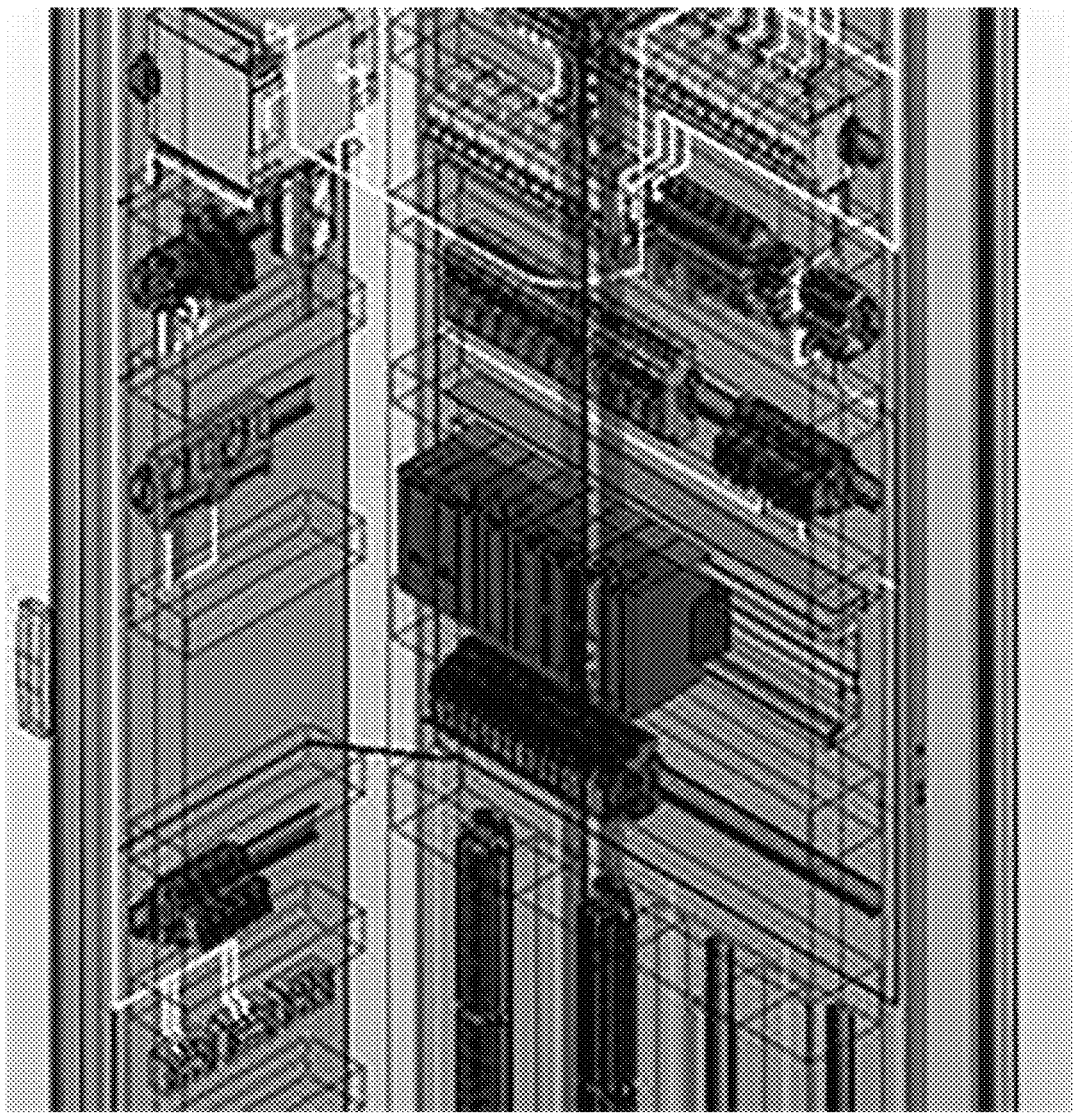

[Figure 6]
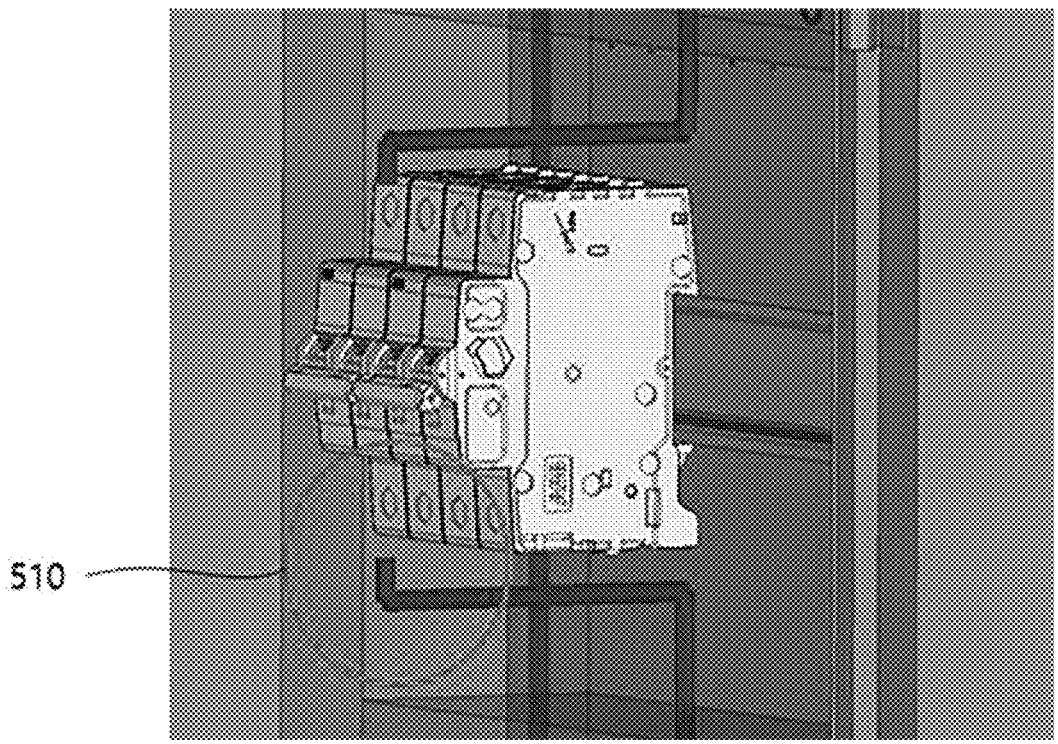

[Figure 7A]
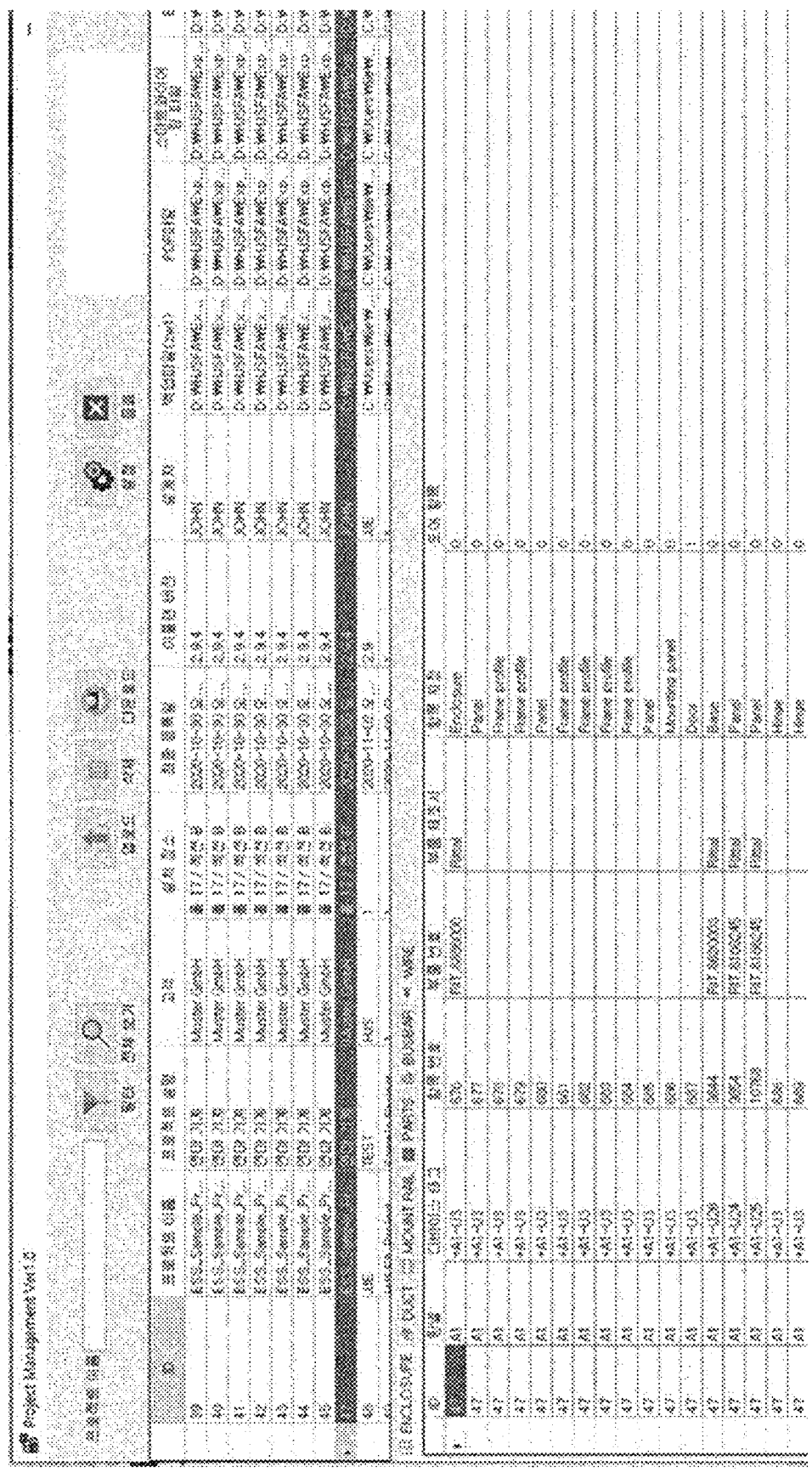

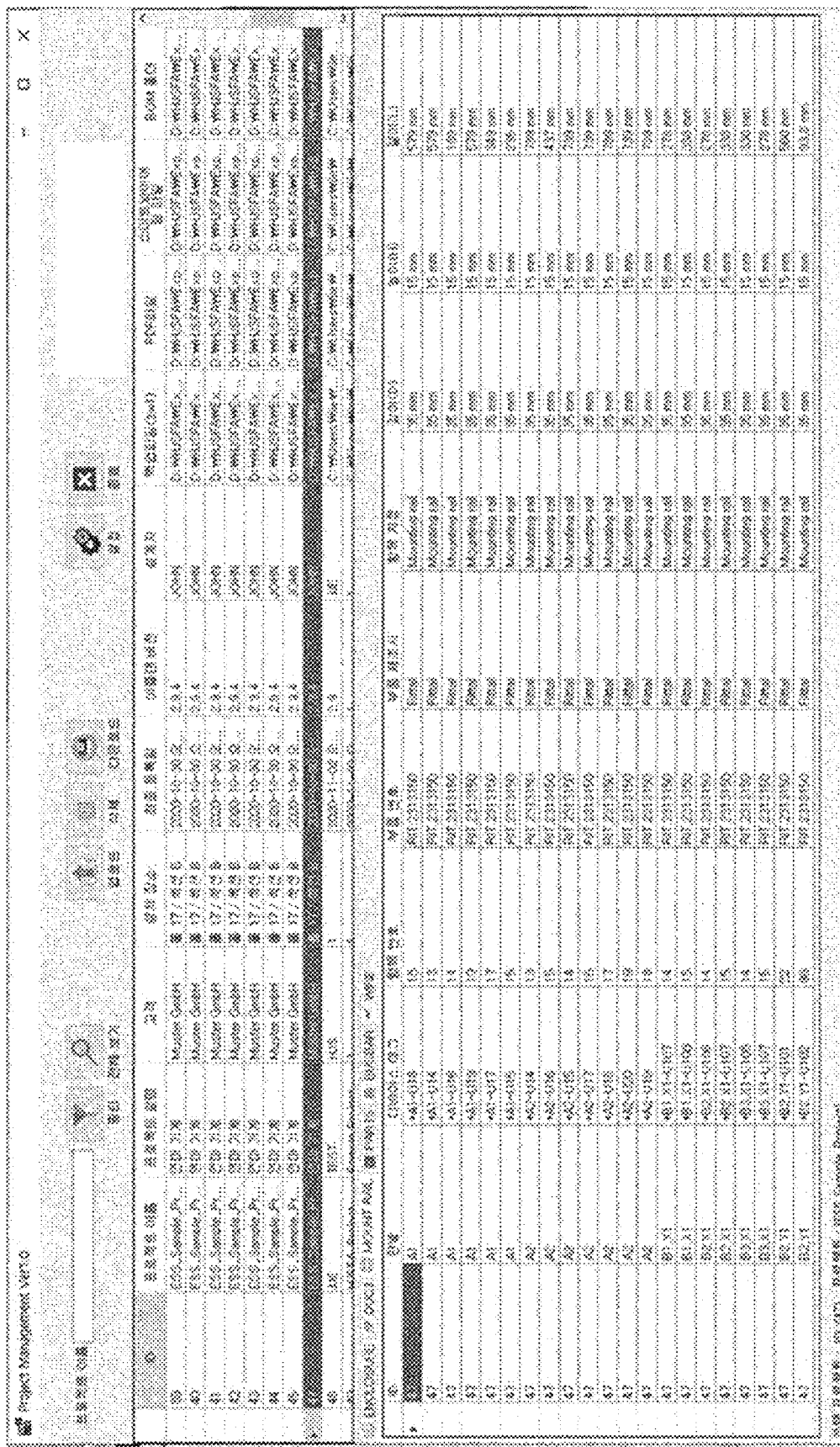
[Figure 7B]

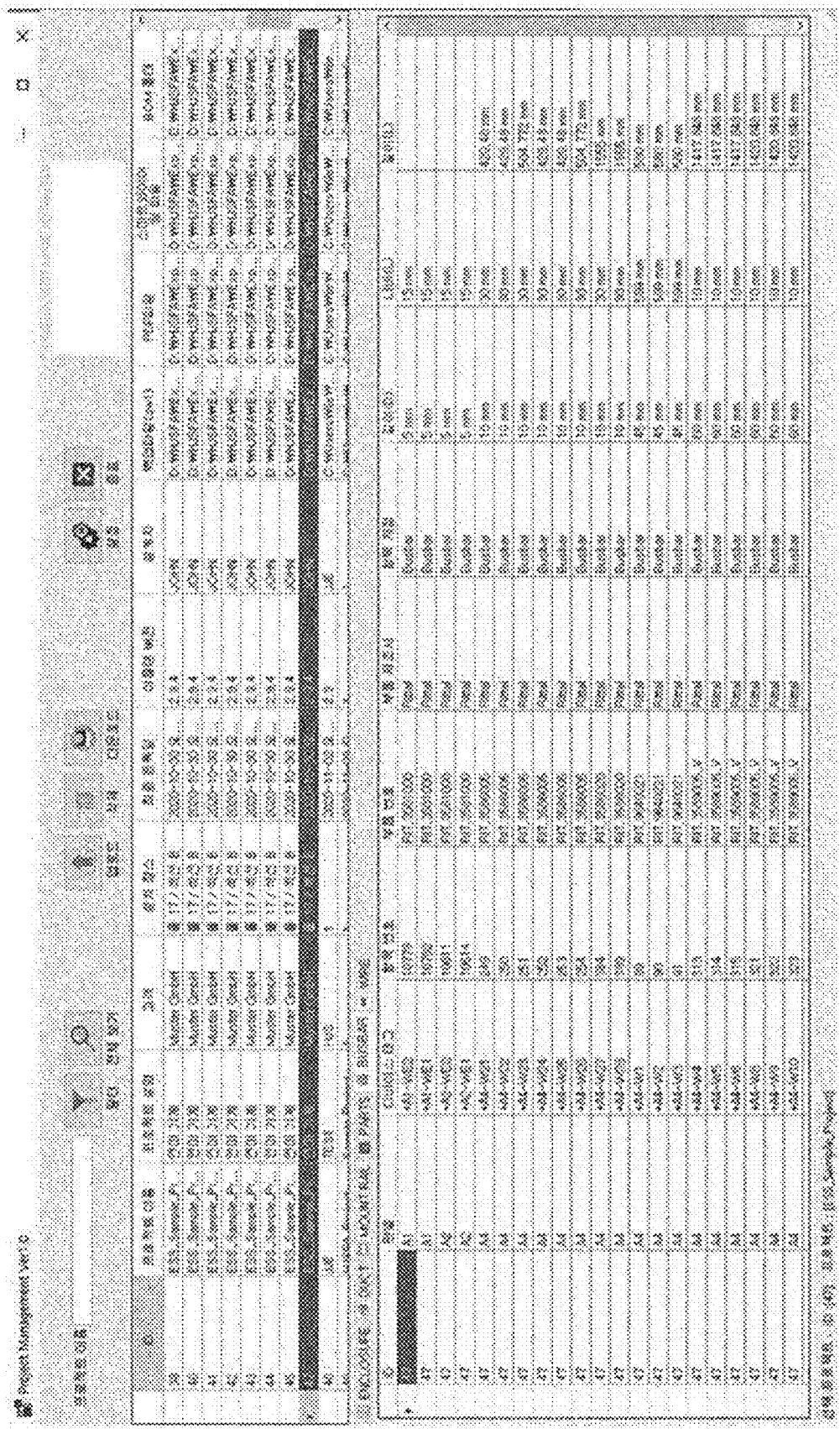
[Figure 7C]

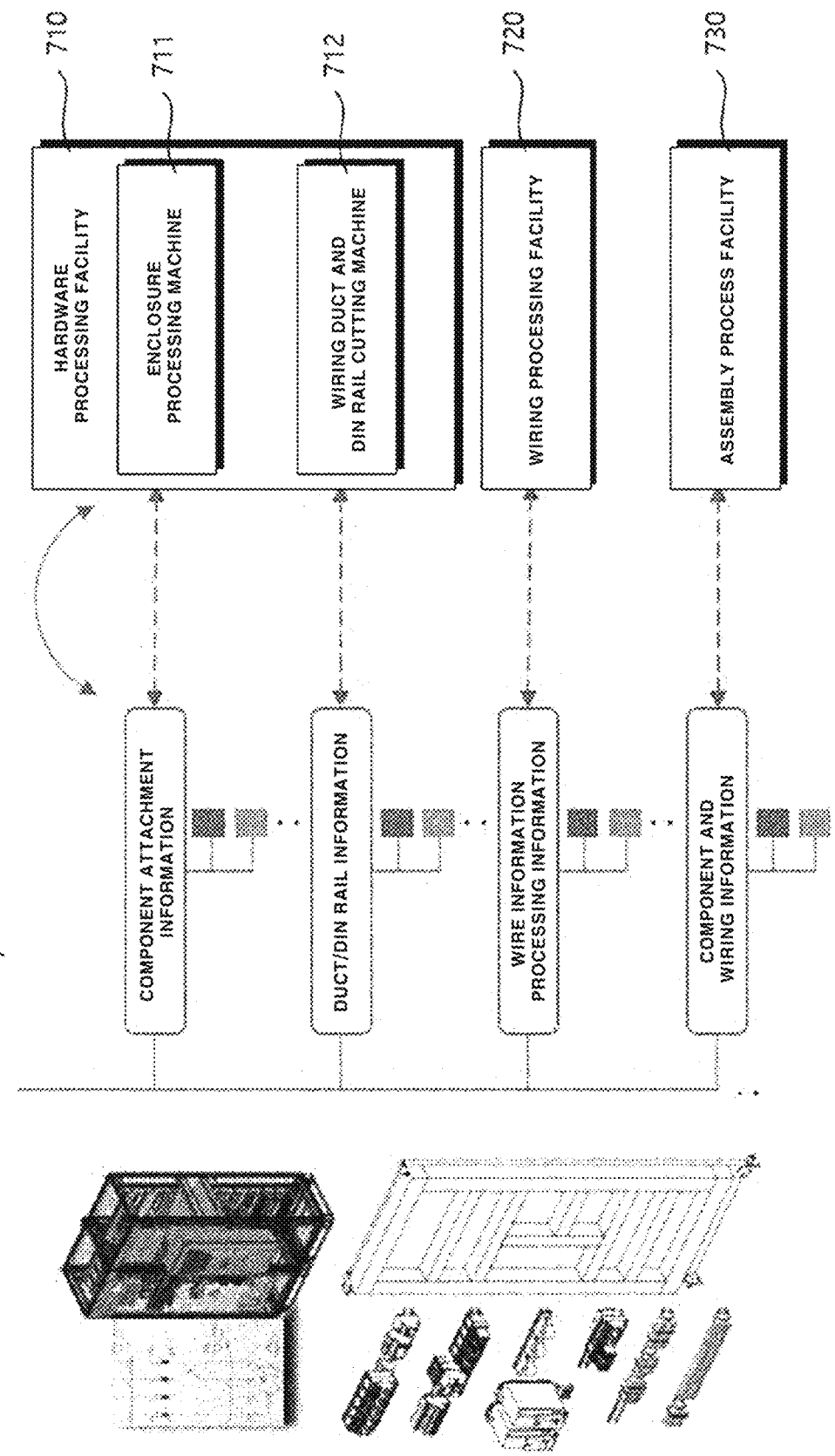
[Figure 8]

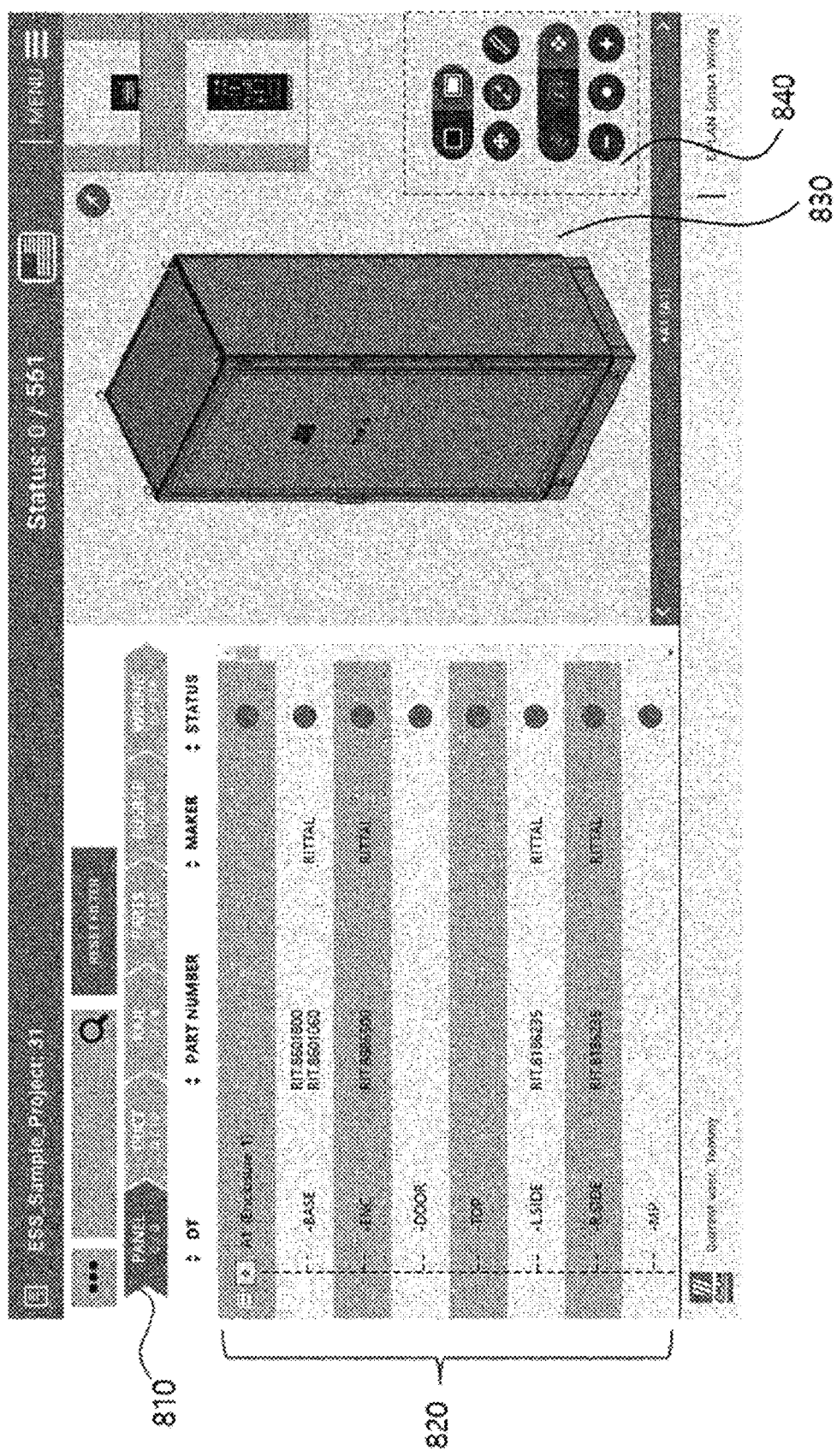
[Figure 9A]

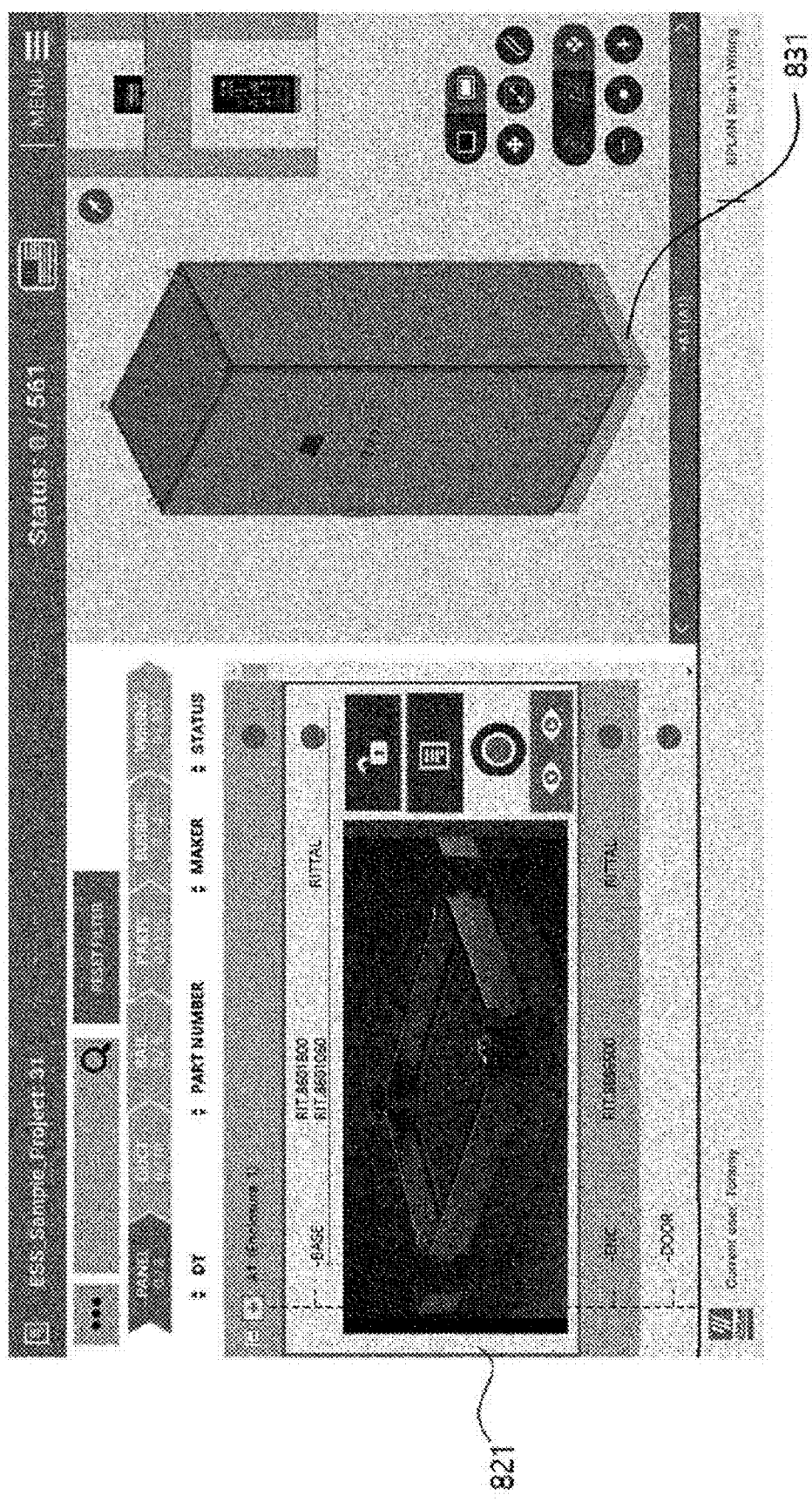
[Figure 9B]

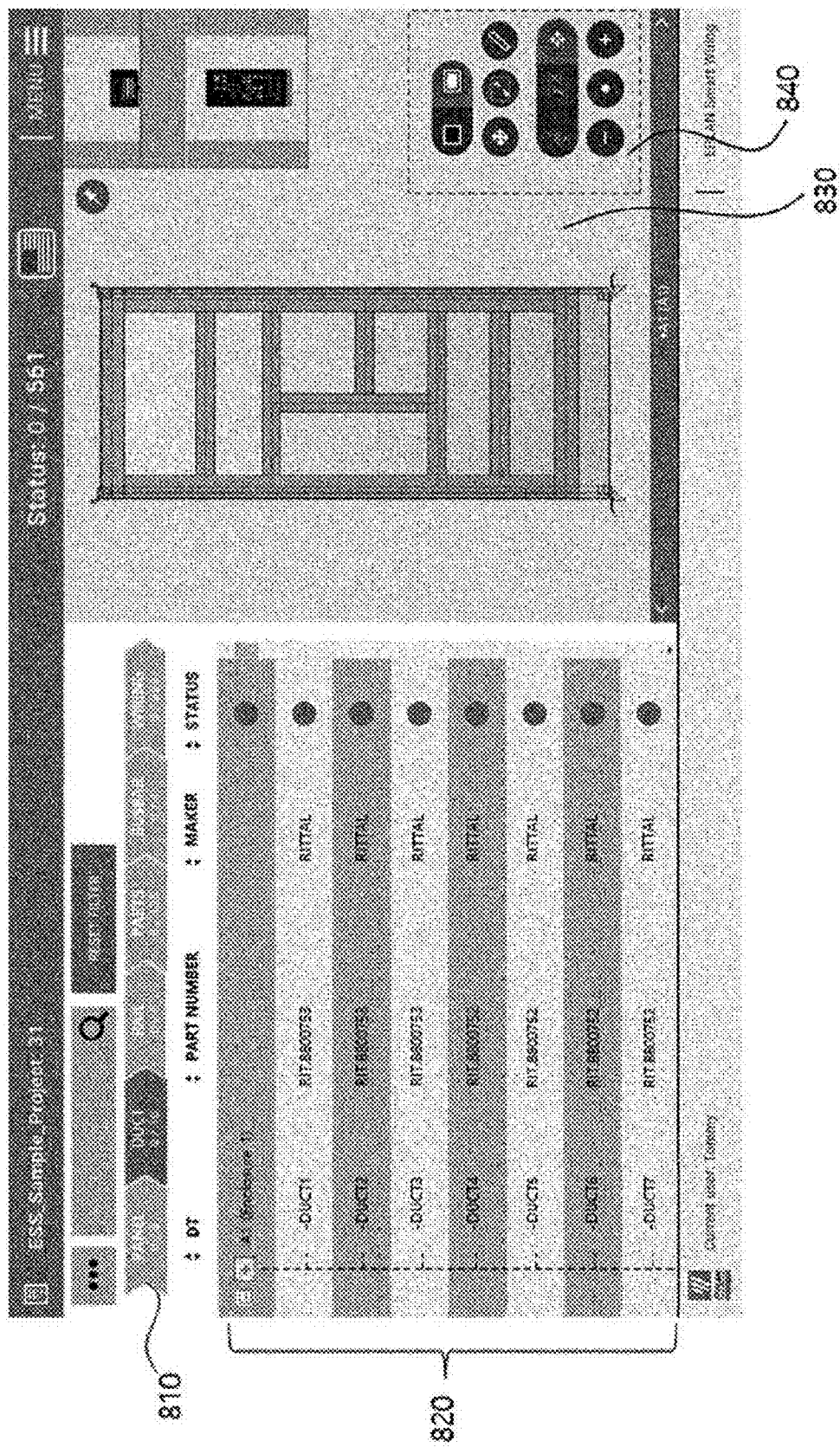
[Figure 10A]

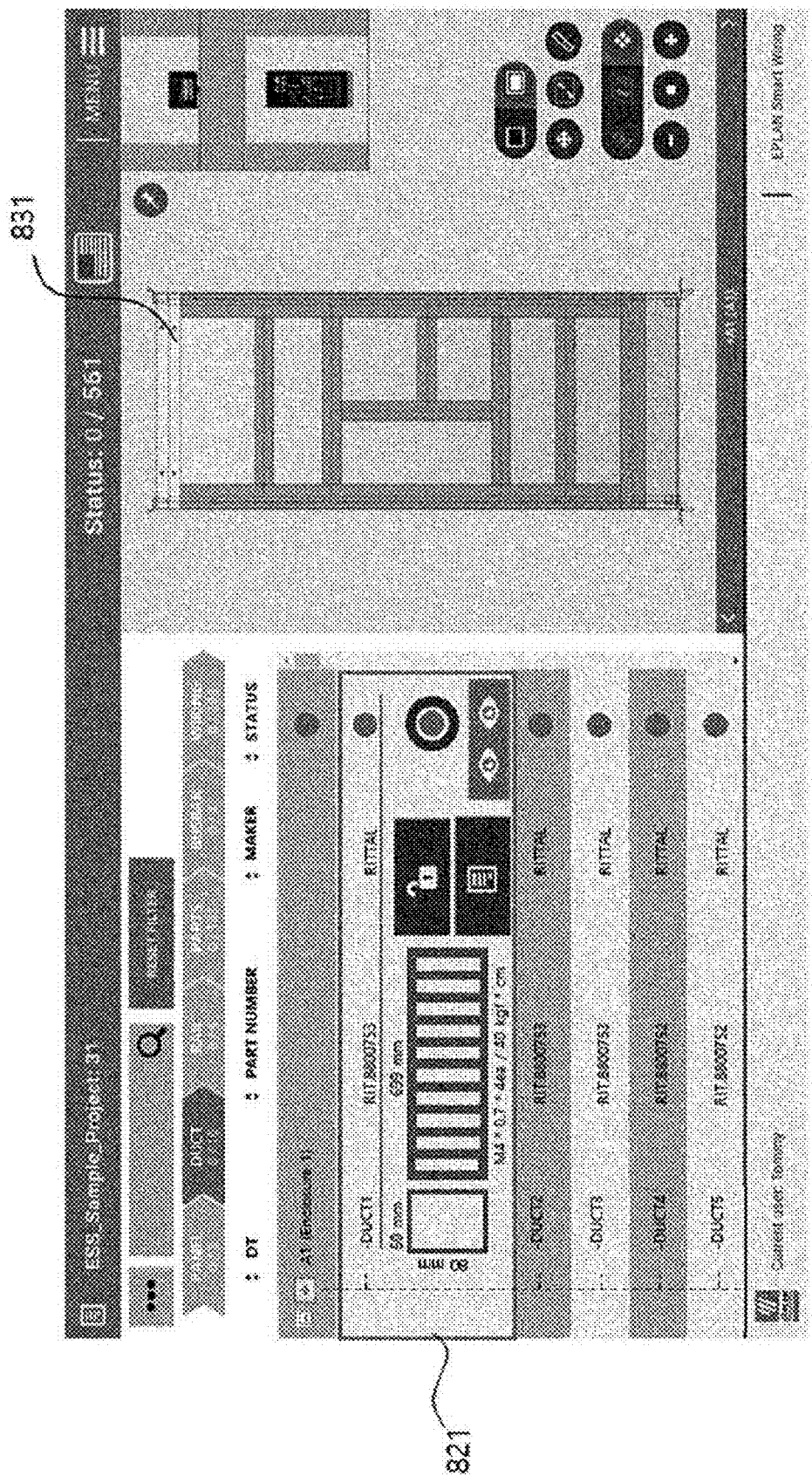
[Figure 10B]

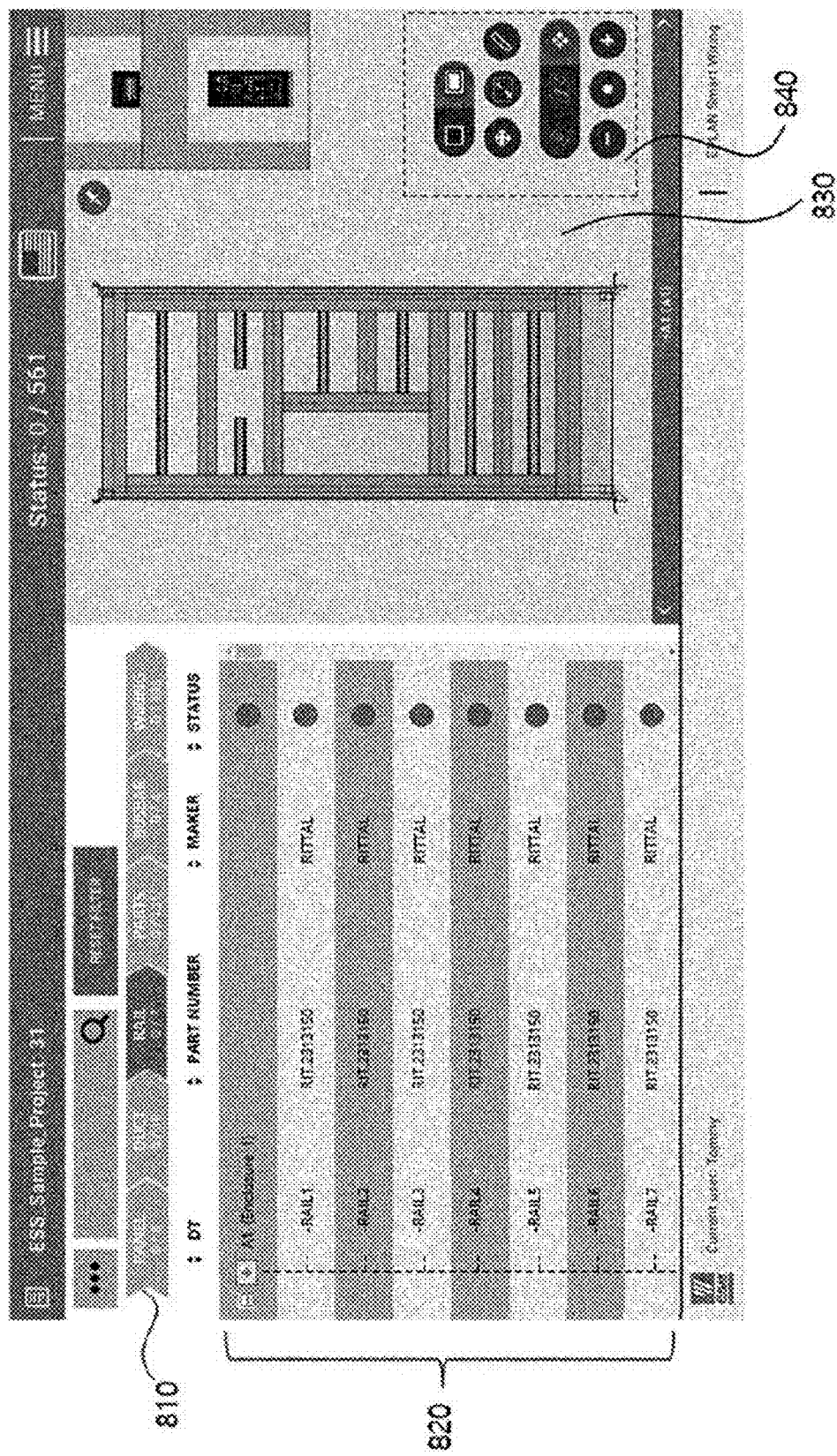
[Figure 11A]

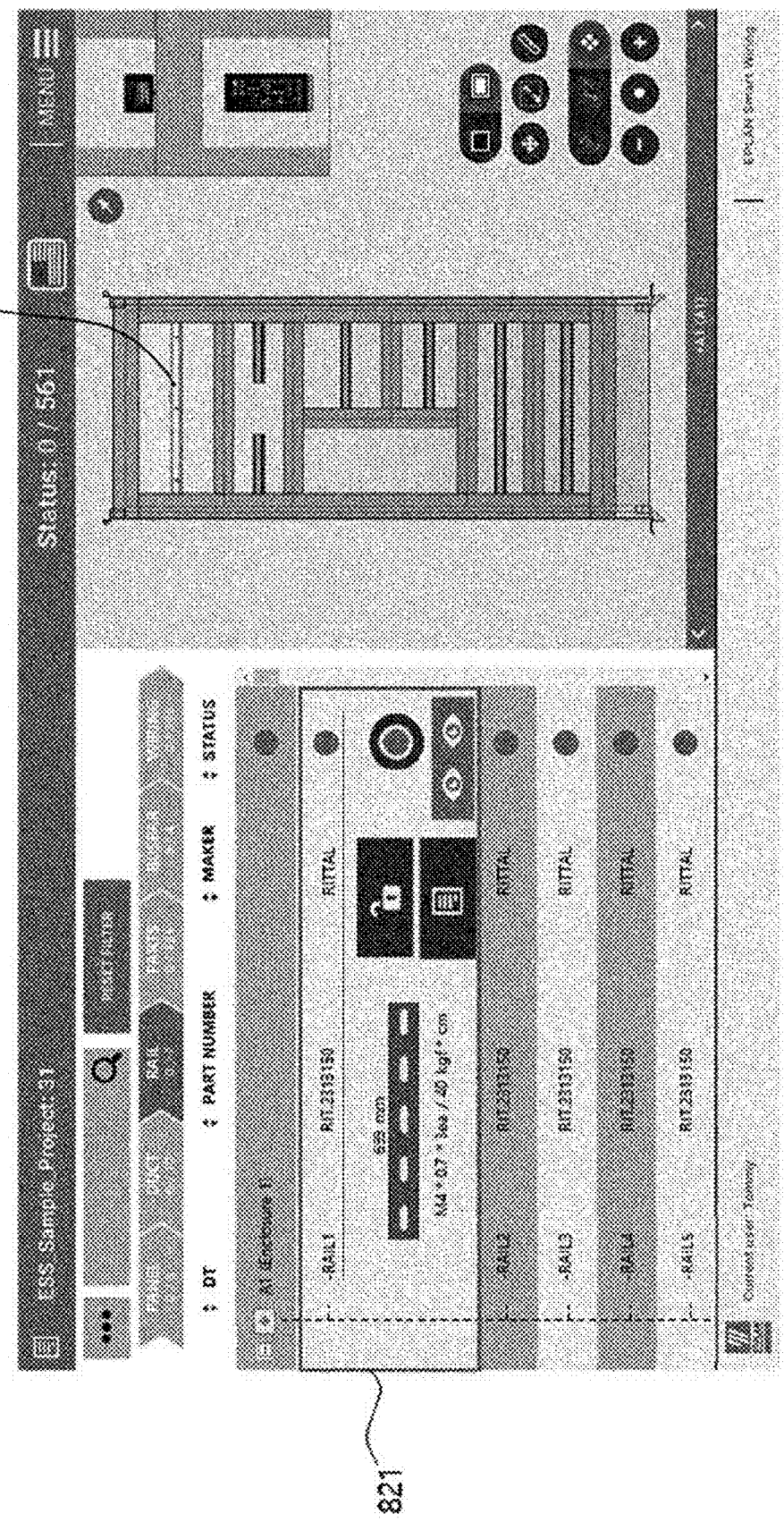
[Figure 11B]

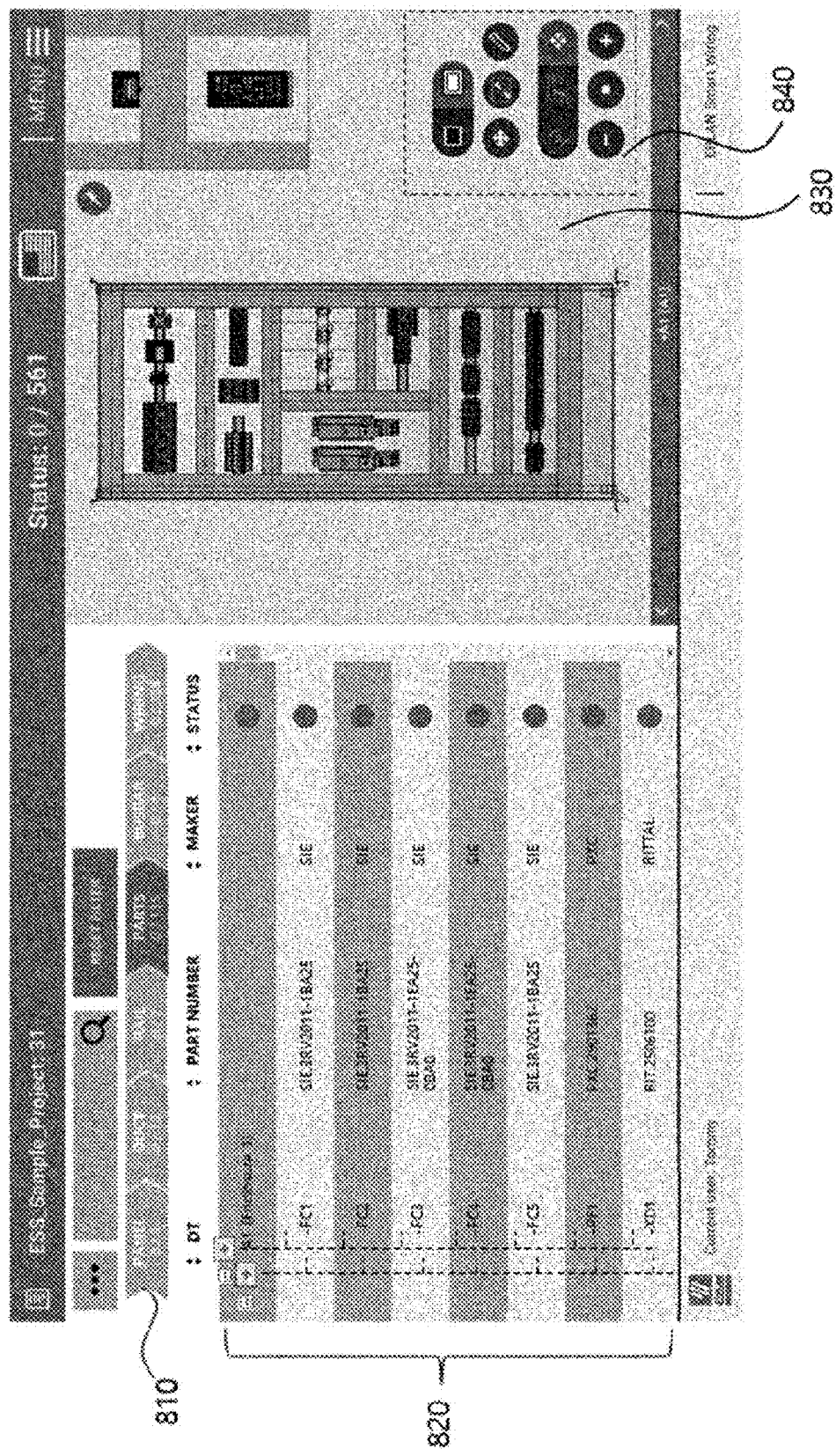
[Figure 12A]

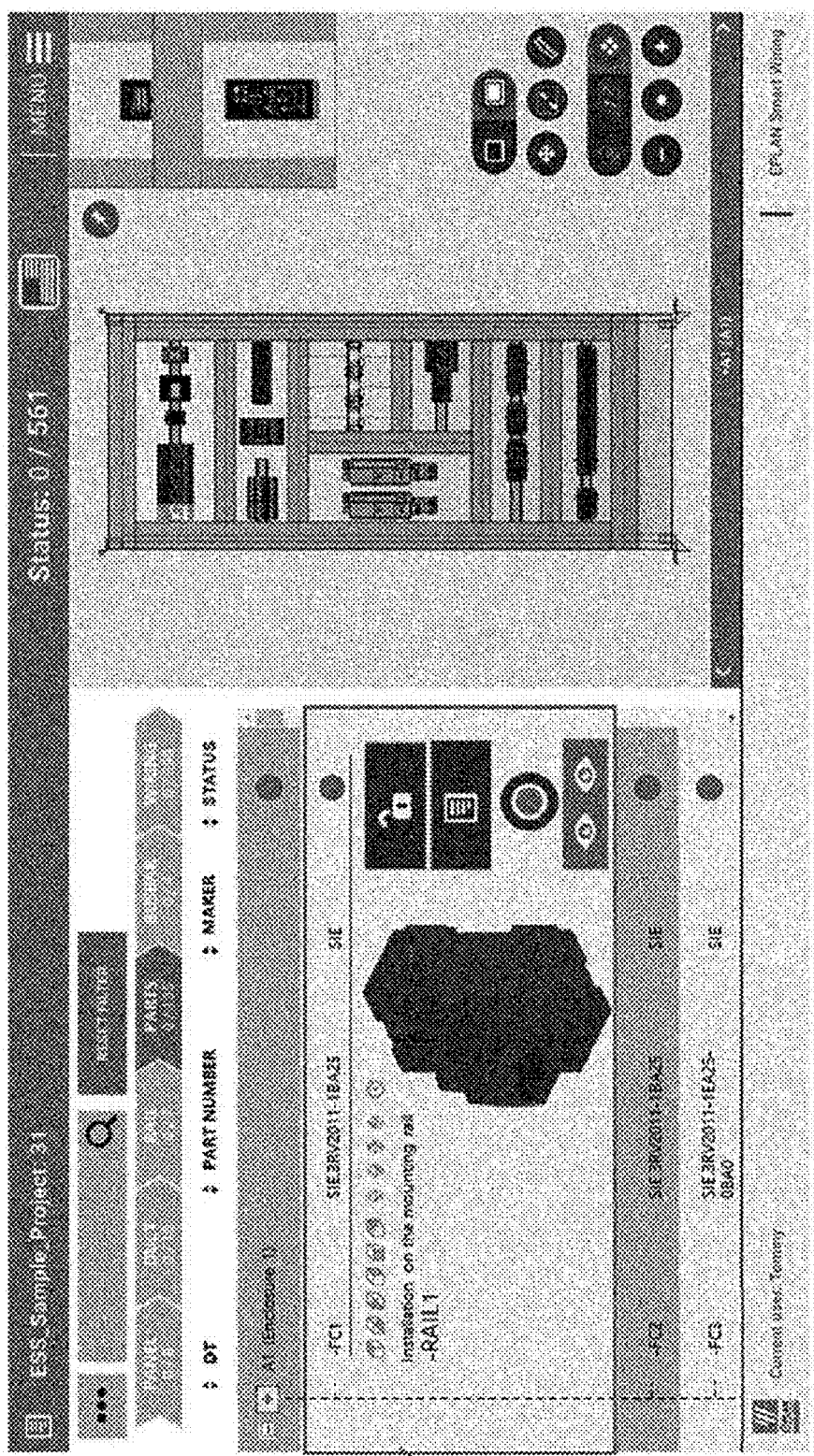
[Figure 12B]

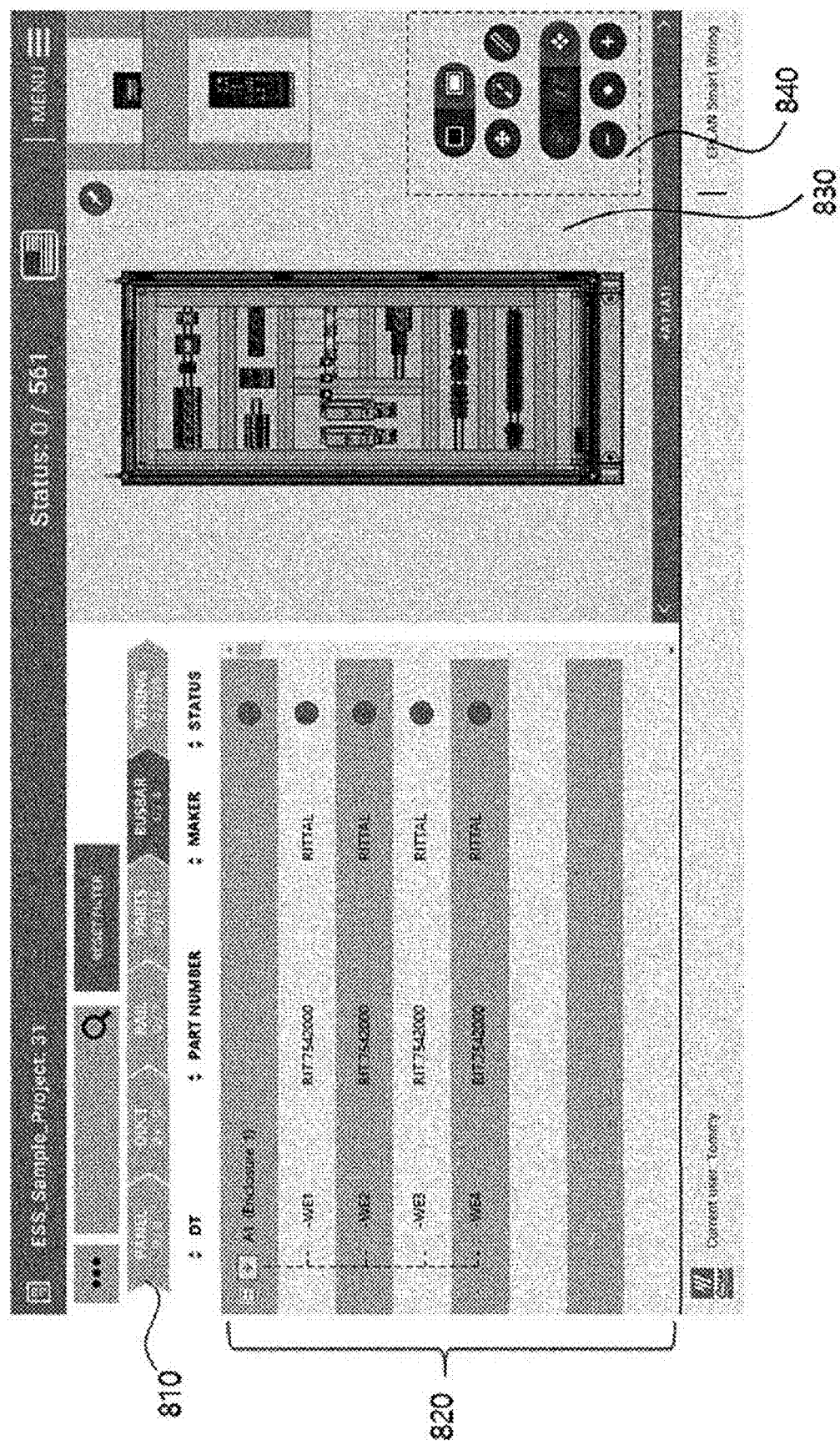
[Figure 13A]

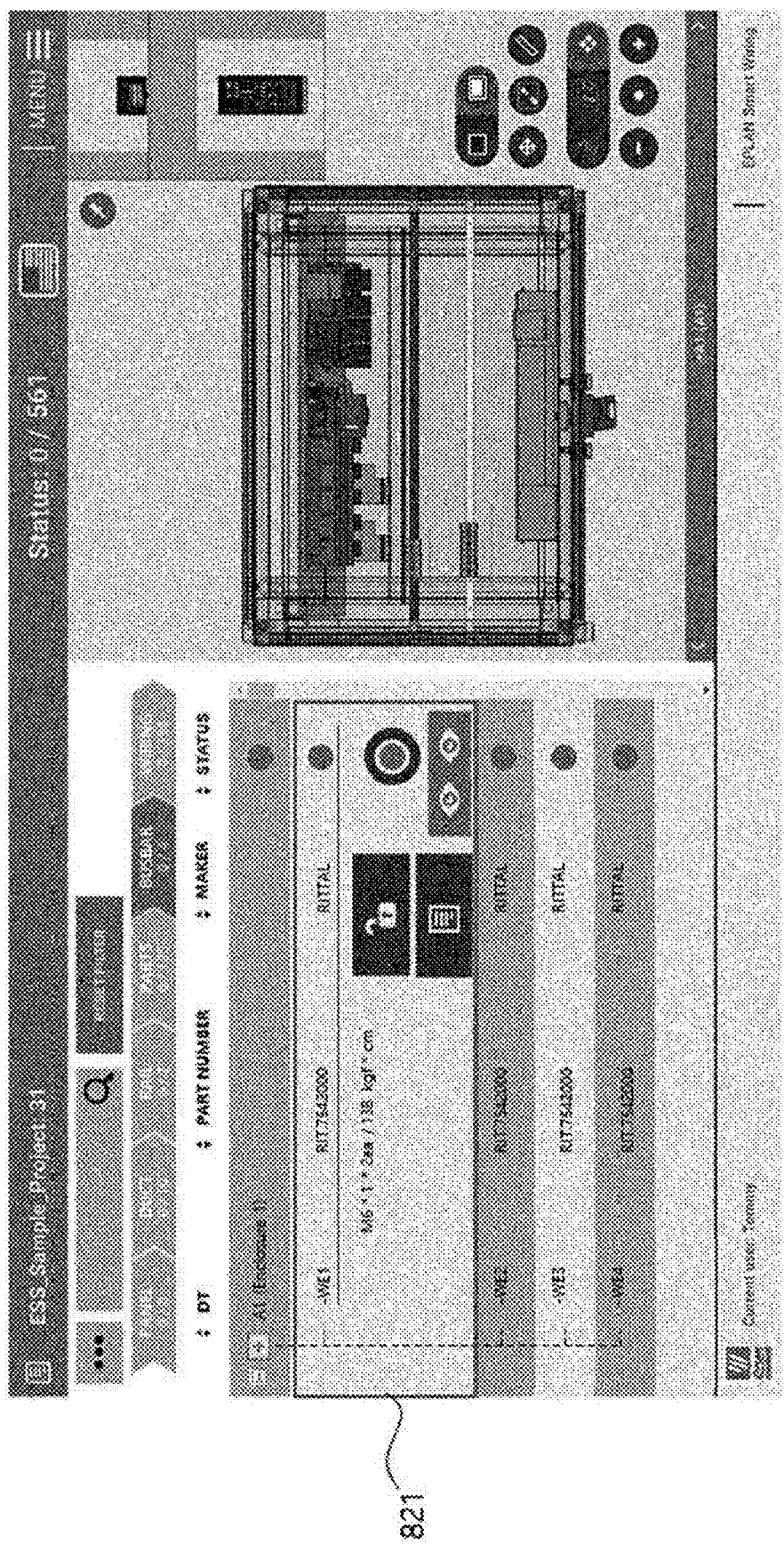
[Figure 13B]

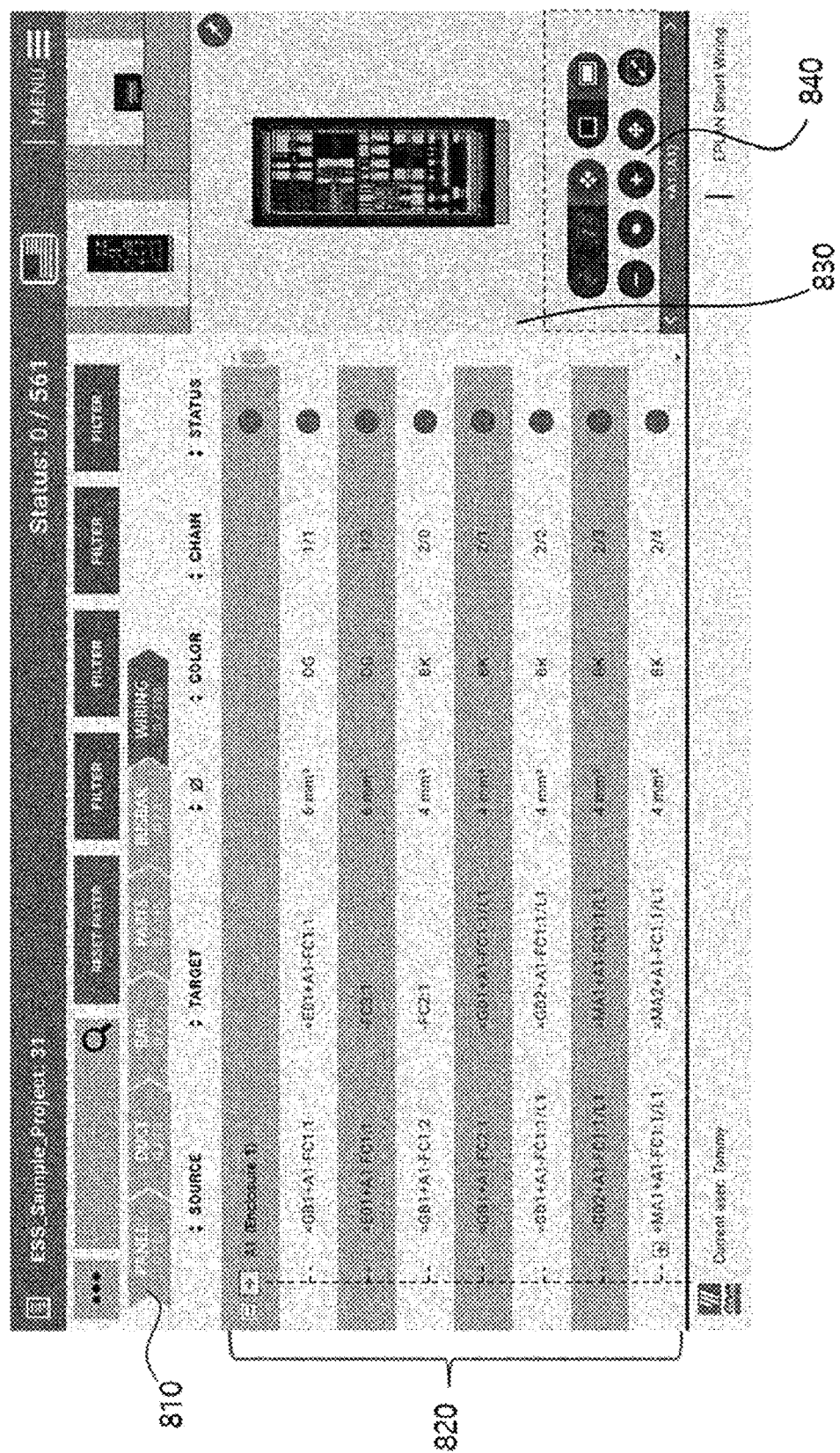
[Figure 14A]

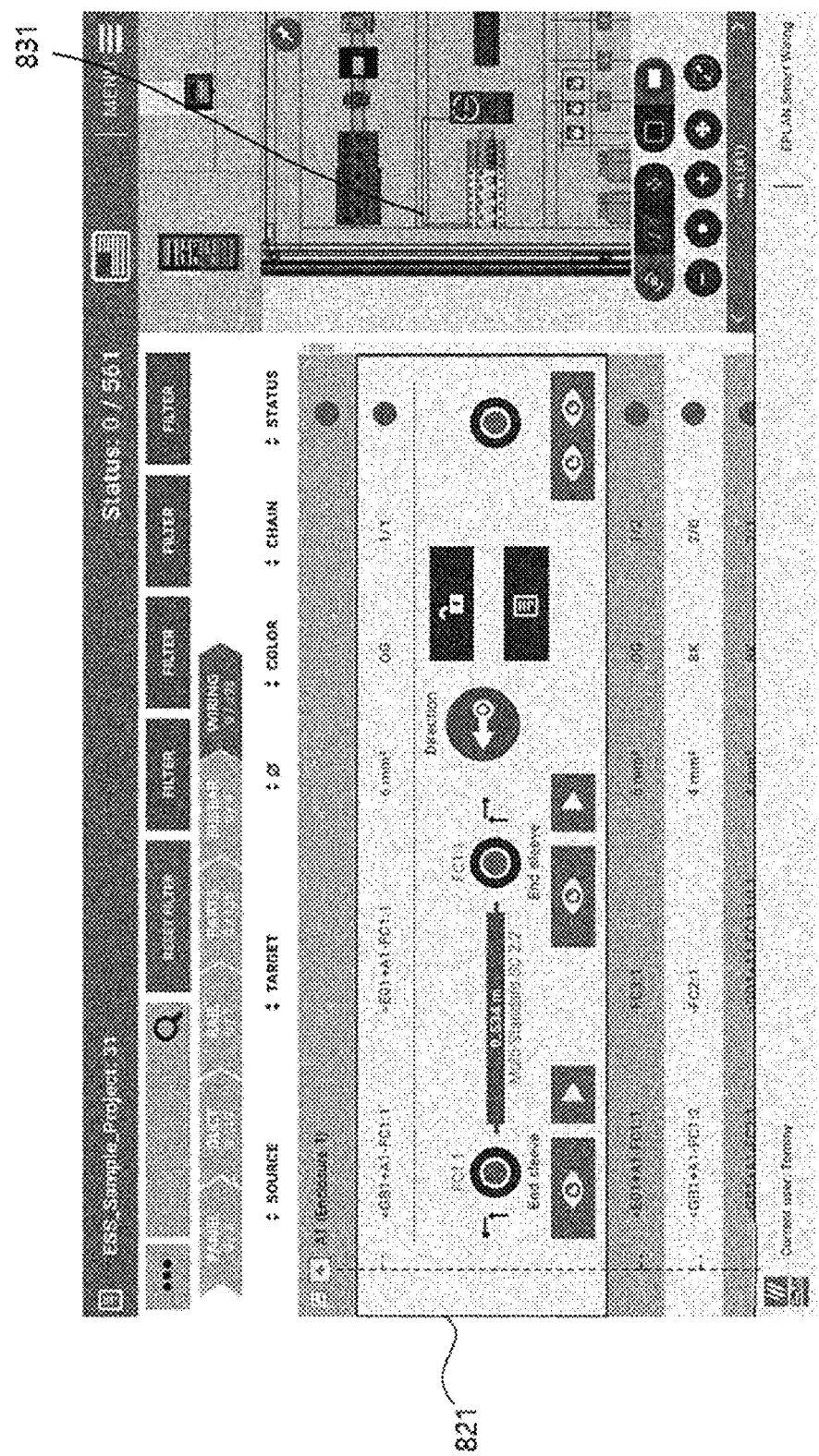
[Figure 14B]

[Figure 15]
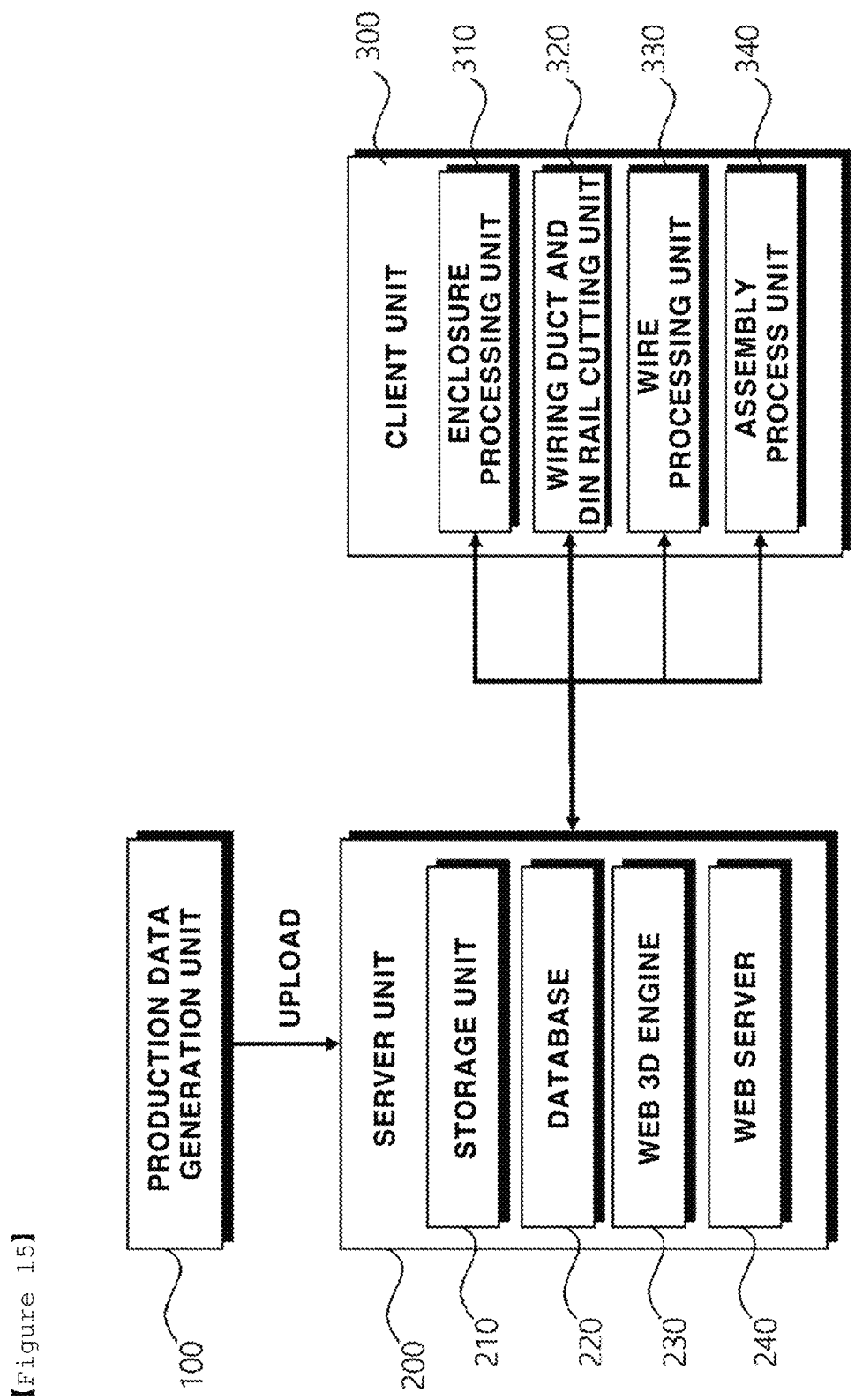

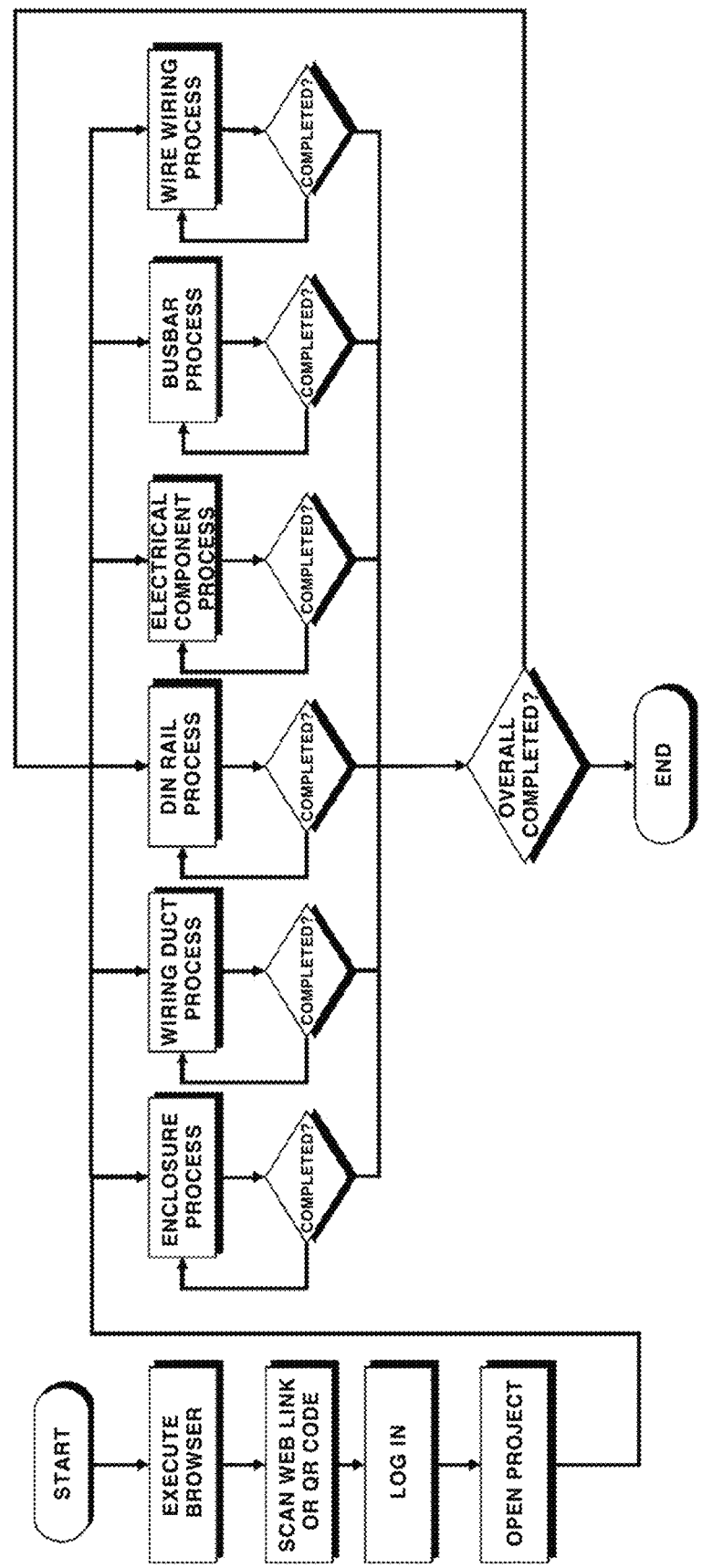
[Figure 16]

PRODUCTION SUPPORT METHOD AND SYSTEM FOR POWER CONTROL PANEL PRODUCTION AUTOMATION

TECHNICAL FIELD

The present invention relates to a production support method and system for power control panel production automation that supports the production of workers in order to improve productivity and work environment when producing a power control panel.

BACKGROUND ART

A control panel is an enclosure-based product that includes control equipment, electrical components, and the like to control electricity of a machine or a facility, and is used throughout industries such as air conditioning and power control of factories, plants, and buildings.

In particular, it is essential for the automation of manufacturing plants, and reliability of products is becoming more and more important than anything else in a highly sophisticated and intelligent manufacturing environment such as the 4th industrial revolution.

In the case of the conventional control panel production, the classic graphic-based design using CAD does not sufficiently reflect the engineering information required for production, and production instructions are made while an intention of a designer is not sufficiently reflected in production sites due to duplication and omission during the design process, so errors frequently occur during the manufacturing process.

In addition, the consistency of the design drawings is not secured due to different drawing expression methods for each designer, so the reusability of the drawings is degraded, which causes an increase in design time.

Since the control panel has the characteristics of small-lot multi-production and short delivery time, an increase in design time and errors lead to a delay in delivery and quality degradation, which is the fundamental cause of a decline in product competitiveness, and the production process is carried out by highly experienced professional labor force, and the difference in quality of the product occurs according to the skill level of workers. Since the work is carried out depending on the paper drawing information, it causes human errors due to arbitrary interpretation of workers, so the non-automated manpower-oriented manufacturing process may cause poor working conditions and safety accidents.

DISCLOSURE

Technical Problem

The present invention provides a production support method and system for power control panel production automation that sufficiently reflects an intention of a designer in a production site and minimizes errors occurring during production.

In addition, the present invention provides a production support method and system for power control panel production automation that improves work efficiency regardless of worker's career by securing consistency of design drawings.

In addition, the present invention provides a production support method and system for power control panel production automation that prevents human errors due to arbitrary interpretation of a worker caused by work dependent on paper drawing information.

Technical Solution

According to an aspect of the present invention, a production support method of power control panel production automation includes: generating component data by standardizing component information of raw materials required for the power control panel production; interworking the component data with 2D and 3D type component symbols; designing a circuit by loading component data interworking through the 2D type component symbol; arranging and designing a component and an electronic unit inside the power control panel using the 3D type component symbol, and designating an assembly process; implementing the power control panel designed in a 3D type in a virtual environment and verifying an error by simulating wiring path information of the designed component and electronic unit; collecting distributed information to support the production automation of the power control panel designed in the 3D type, which has been verified and extracting production data for each process including component information for each process, component and electronic unit arrangement information, assembly process information, and wiring information; and automating production by applying the production data to each interworking production facility to support the production automation of the power control panel.

The component information of the raw material may include at least one of a component name, a model number, capacity information, a component manufacturer, a component specification, an outline drawing, an external dimension, and a function template (terminal number).

As the production data for each process, an enclosure may include a device tag, an item number, a component number, a component manufacturer, an item designation, and an door item, a wiring duct, may include the device tag, the item number, the component number, the component manufacturer, the item designation, a depth, a width, a finger width, a slot width, and a length, a DIN rail may include the device tag, the item number, the component number, the component manufacturer, the item designation, the depth, a height, and the length, an electrical component may include the device tag, the item number, the component number, the component manufacturer, and the item designation, a busbar may include the device tag, the item number, the component number, the component manufacturer, the item designation, the depth, the width, and the length, and a wire wiring may include a bundle group, a bundle number, bumper-buffing, a source device tag, a target device tag, a wire color, a wire cross-section area, a wire length, source terminal processing, target terminal processing, a wiring path, a source wiring direction, a target wiring direction, a connection type, a connection remark, a component number, a manufacturer, an object ID, and a connection index.

The production data for each process may include a project (*.zwl) format including design information, a digital work guide (*.epdz) format for component assembly and wiring work in the assembly process, a bill of material (BOM) (*.xlsx) format including component information constituting the power control panel, a PDF (*.pdf) format for checking a design drawing, and an AutomationML (*.ami) format for interworking automation equipment.

According to another aspect of the present invention, a production support system for power control panel production automation includes: a production data generation unit that standardizes component information of raw materials for each process required for the power control panel production to generate component data, interlocks the component data with 2D and 3D type component symbols, and loads the interlocked component data through the 2D type component symbol to design a circuit, arranges and designs a component and an electronic unit inside the power control panel with the 3D type component symbol, designates the assembly process, implements the power control panel designed in the 3D type in a virtual environment, simulates wiring path information of the designed component and electronic unit to verify an error, collects distributed information to support the production automation of the power control panel designed in the 3D type, which has been verified, and extracts production data for each process including component information for each process, component and electronic unit arrangement information, assembly process information, and wiring information; a server unit into which the production data for each process generated by the production data generation unit is uploaded; and a client unit that accesses the server, receives production data according to a corresponding process, applies the received production data to the corresponding process, processes, cuts, and produces the component according to the production data, and guides the component assembly.

The production data for each process may include a project (*.zwl) format including design information, a digital work guide (*.epdz) format for component assembly and wiring work in the assembly process, a bill of material (BOM) (*.xlsx) format including component information constituting the power control panel, a PDF (*.pdf) format for checking a design drawing, and an AutomationML (*.ami) format for interworking automation equipment.

The client unit may include an enclosure processing unit that receives each component attachment information and processes a component attachment position within the enclosure, a duct and DIN rail cutting unit that cuts a duct and DIN rail, a wire processing unit that produces a wire harness, and an assembly process unit that assembles processing, cutting, and produced power control panel components.

The assembly process unit may sequentially perform an enclosure process, a wiring duct process, a DIN rail process, an electrical component process, a busbar process, and a wire wiring process.

The client unit may access the server through a web browser or may be connected to the server with a device tag designated for each process to receive production data for each process.

The digital work guide of the production data for each process may guide component assembly by displaying a work list for each process and 3D images for the process.

Advantageous Effects

As described above, according to the present invention, it is possible to improve work efficiency regardless of a worker's career by sufficiently reflecting an intention of a designer in a production site and securing the consistency of design drawings.

In addition, according to the present invention, it is possible to prevent human errors due to arbitrary interpretation of workers caused by work dependent on hard-copied drawing information, and it is possible to significantly reduce a labor force of workers and an error rate caused by incorrect input by automatically inputting raw material information required for each process.

DESCRIPTION OF DRAWINGS

FIG. 1 is a flowchart illustrating a power control panel production process.

FIG. 2 is a flowchart illustrating a production support method of power control panel production automation according to an embodiment of the present invention.

FIG. 3 is a diagram illustrating an arrangement of components and electronic units of the production support method of power control panel production automation according to the embodiment of the present invention.

FIG. 4 is an embodiment illustrating wiring connection information of the production support method of power control panel production automation according to the embodiment of the present invention.

FIG. 5 is a diagram illustrating a wiring in the arrangement of the components and electronic units of FIG. 3.

FIG. 6 is an exemplary view illustrating a state in which the wiring is not properly made in the production support method of power control panel production automation according to the embodiment of the present invention.

FIGS. 7A, 7B and 7C are exemplary diagrams illustrating component data included in production data of the production support method of power control panel production automation according to the embodiment of the present invention.

FIG. 8 is a diagram illustrating an application of production data to an interworking production facility of the production support method of power control panel production automation according to the embodiment of the present invention.

FIGS. 9A, 9B, 10A, 10B, 11A, 11B, 12A, 12B, 13A, 13B, 14A and 14B are diagrams illustrating a digital work guide for each process of the production support method for power control panel production automation according to the embodiment of the present invention.

FIG. 15 is a configuration diagram illustrating a production support system of power control panel production automation according to an embodiment of the present invention.

FIG. 16 is a block diagram illustrating a flow of an assembly process unit of the production support system for power control panel production automation according to the embodiment of the present invention.

BEST MODE

Hereinafter, embodiments of the present invention will be described in detail with reference to the accompanying drawings.

In addition, sizes or shapes of components shown in the drawings may be exaggerated for clarity and convenience of description, and terms specifically defined in consideration of the configuration and operation of the present invention may vary depending on the intention or custom of the user or operator. The definitions of these terms should be made based on the contents throughout this specification.

As shown in FIG. 1, a power control panel 10 includes an enclosure 11, a wiring duct 12, a DIN rail 13, an electrical component 14, a bus bar 15, a wire wiring 16, and a wire wiring 16.

Here, the enclosure 11 is an external enclosure made of a metal material constituting the power control panel 10, and is assembled with components having different sizes.

The wiring duct 12 is a passage structure made of plastic attached to the enclosure for wire wiring.

The DIN rail 13 is a standardized metal rail for mounting electrical components, and the electrical component 14 is an electrical device component for the purpose of controlling electrical signals.

In addition, the busbar 15 is a metal conductor for inducing a high voltage current, and the wire wiring 16 is a wire product that provides power and electrical signals to the electrical component 14.

Conventionally, in order to form the power control panel 10 with such a configuration, since a worker uses a hard-copied drawing so that he/she may visually check information necessary for each process, measures component and assembly information, such as the position of the enclosure hole, the position of the component, the length of the duct Din rail, and the length of the wire required for wiring between components, one by one, inputs the measured data to the equipment required for the process to prepare the necessary components, and performs the assembly, if the worker is not a skilled worker, it is not easy to grasp an intention of a designer, and efficiency does not increase as he/she has to rely on the hard copied drawings.

Accordingly, according to the present invention, by automatically transmitting each component information for each process used in design to each process to automatically process and produce the necessary components without the worker inputting, to each process equipment, the component information required for each process as well as the hard-copied drawings so that he/she may visually check information necessary for each process, and guiding the assembly process even to parts where workers have to perform, it is possible to significantly increase the power control panel production efficiency.

The production support method of power control panel production automation for this is as follows.

FIG. 2 is a flowchart illustrating a production support method of power control panel production automation according to an embodiment of the present invention. First, component data is generated by standardizing component information of raw materials required for the power control panel production (S100).

Here, the component information of the raw material includes at least one of a component name, a model number, capacity information, a component manufacturer, a component specification, an outline drawing, an external dimension, and a function template (terminal number). In this case, the component information of the raw material may generate component data by inputting data suitable for formats of each item in a spreadsheet (ex; Excel).

Through this standardized component information, it is easy to perform data processing on various types of component information.

Subsequently, component data and component symbols in 2D and 3D type interwork each other (S200). That is, the component name of the input component data and the 2D and 3D type component symbol name match and interwork each other.

This is to ensure that, by listing up the component data is listed up whenever the 2D and 3D symbols corresponding to the component are used, a worker may easily grasp all information on the used component and the component data as well as the component name.

Next, a circuit is designed by loading the component data interworking through the 2D type component symbol (S300).

By designing circuits using the 2D type component symbols, the component data management is facilitated with only the component symbols used, and the circuit design is facilitated by using simple symbols.

Next, the component and the electronic unit are arranged and designed inside the power control panel using the 3D type component symbol, and the order of the assembly process is designated (S400).

Here, the arrangement of the component and electronic unit may be as shown in FIG. 3, and it is preferable to arrange the component and the electronic unit by applying wire terminal information and wiring information.

The order of the assembly process should all be performed sequentially, and the processed component and the finished product component are assembled in the order of the enclosure, the duct, the DIN rail, the electrical component, the busbar, and the wire wiring, but the connection order may be specified in each process.

Next, the power control panel designed in the 3D type is implemented in the virtual environment and errors are verified by simulating the wiring path information of the designed component and electronic unit (S500).

In this case, in the wiring path of the component and the electronic unit, as shown in FIG. 4, the connection position of the wiring is input as X, Y, Z coordinate values, and the connection direction of the wiring are input as a routing direction and X, Y, Z coordinate values.

In addition, as shown in FIG. 5, the routing path is set by setting the position of the wiring duct and the DIN rail, and the wiring path and the wire length are automatically calculated by setting the positions of the bus bar and the electrical component to perform the automatic routing. This is possible when the component position data is accurately input.

On the other hand, as shown in FIG. 6, when the component data is omitted and the positioning of the arrangement of the component and the electronic unit is not properly set, the length of the wire is not automatically calculated and a connection miss 510 occurs, so errors may be verified in the simulation.

It is preferable that the 3D type power control panel implemented in the virtual environment is designed based on engineering data to match the real thing.

Next, the distributed information is collected to support the production automation of the power control panel designed in the 3D type, which has been verified, to extract the production data for each process including the component information for each process, the component and electronic unit arrangement information, the assembly process information, and the wiring information (S600).

Here, the production data for each process is data obtained by collecting and deriving the information input during the component data, the 2D circuit design, and the 3D power control panel design, and includes the following component data for each part of the power control panel 10.

FIG. 7 is an exemplary view illustrating component data included in production data for power control panel project No. 47, and the enclosure 11 of FIG. 7A includes information on a device tag, an item number, a component number, a component manufacturer, an item designation, and an door item, the wiring duct 12 of FIG. 7B includes the component data includes the device tag, the item number, the component number, the component manufacturer, the item designation, a depth, a width, a finger width, a slot width, and a length, the DIN rail 13 includes the component data includes the information on the device tag, the item number, the component number, the component manufacturer, the item designation, the depth, a height, and the length, the electrical component 14 includes the device tag, the item number, the component number, the component manufacturer, and the item designation, and the busbar 15 of FIG. 7C includes the device tag, the item number, the component number, the component manufacturer, the item designation, the depth, the width, and the length.

In addition, the wire wiring 16 includes a bundle group, a bundle number, bumper-buffing, a source device tag, a target device tag, a wire color, a wire cross-section area, a wire length, source terminal processing, target terminal processing, a wiring path, a source wiring direction, a target wiring direction, a connection type, a connection remark, a component number, a manufacturer, an object ID, and a connection index.

Here, in the case of the enclosure 11, the wiring duct 12, the DIN rail 13, the electrical component 14, and the busbar 15, the device tag, the item number, the component number, the component manufacturer, and the item designation are common and the item designation means detailed items of each component.

Also, in each process, the item number means the number in the drawing of the corresponding item, and the component number means the number of the corresponding component.

In addition, the door item of the enclosure 11 is displayed as 0 or 1 as a mark for checking the internal components by opening or excluding the door when checking the entire control panel in 3D, and the enclosure 11, the wiring duct 12 and DIN rail process 13 is a process that requires a hardware structure, and is specification information of necessary raw materials.

In the wire wiring 16, the process of producing a wire bundle should be prioritized, but in the present invention, the description of the wire bundle production is omitted and the wire wiring process is performed using the produced bundle.

Here, the wire bundle is a unit that bundles wires by taping in a device or potential unit, the bundle group means a group name of a bundle, and the bundle number is a number of a single strand of wire.

In addition, the numbering is the wire name, the source device tag is the device tag number on the source side, the target device tag means the device tag number on the target side, the source terminal processing and the target terminal processing mean the type of terminal which is a ferrule, a special pin, or the like.

The wire marking follows the IEC 81346 standard, and the information is printed on the surface of the wire to identify the wiring path.

The wire color, the wire cross-section area, and the wire length are settings to match the displayed color and cross-section area to facilitate work during the wiring, and the wire length means the wire length automatically calculated during the wiring, and the target wiring direction means the direction set during the wiring.

The wiring path indicates the path through which the wiring passes.

The connection type means a wire specification, and the connection mark is a comment about additional information, precautions, or the like.

In addition, the object ID is a 3D object number and means a reference ID of the entire component, and the connection index is the wire number and means a wire reference ID.

In the case of the power control panel 10, it is difficult to identify and manufacture the wires or there is difficulty in wiring work. Accordingly, after a unique number is assigned to each individual wire, the wires are grouped based on potential or device and assigned the unique number in bundle units, and thus, is automatically implemented in the computer aided engineering (CAE) design environment.

This reduces design time and enables quick and accurate wiring work at the production site.

The production data including the above information is generated in five formats, and is divided into project (*.zwl) including design information, digital work guide (*.epdz) for component assembly and wiring work in the assembly process, bill of material (BOM) (*.xlsx) including component information constituting the power control panel, PDF (*.pdf) for checking a design drawing, and AutomationML (*.ami) for interworking automation equipment.

A project is for classifying design information, and includes design information for each different power control panel or equipment.

The digital work guide provides a guide so that the process of assembling the power control panel can be sequentially or selectively output through the output device provided in the interworking production facility. The assembly information including at least any one of each component data, the assembly position, the assembly sequence, and the assembly method is provided.

The BOM may be checked in a list form including all component data applied when designing 2D type circuit and 3D type power control panel.

The PDF is provided to be able to check the 2D type circuit and the 3D type power control panel in an image form.

The AutomaionML (hereinafter referred to as 'AML file') is a data exchange format, and makes it easy to view instrument and electric field data at once and enables lossless exchange of engineering data by interworking automation equipment in all processes. In other words, data is exchanged for each process in the AML file format.

For example, it interconnects engineering tools from different fields, such as mechanical facility engineering, electrical design, process design, process control engineering, HMI development, PLC programming, and robot programming.

Finally, to support production automation of the power control panel 10, production data is applied to each interworking production facility to automate production (S700).

Here, as shown in FIG. 8, the interworking production facility is largely divided into hardware (H/W) processing facility 710, wire processing facility 720, and assembly process facility 730.

The hardware (H/W) processing facility 720 includes an enclosure processing machine 711 that receives each component attachment information included in the production data and processes the component attachment position in the enclosure 11, and a duct and DIN-rail cutting machine 712 that receives wiring duct and DIN rail information included in the production data to cut the wiring duct and DIN rail positioned in the enclosure.

In more detail, the enclosure processing machine 711 may be an LC processing machine or a laser processing machine.

In addition, the wire processing facility 720 produces a wire harness for wire wiring through a bundle group, a bundle number, numbering, a wire color, a wire cross-section area, a wire length, a wiring path, a connection type, a connection remark, a component number, and manufacturer information, which are wire wiring information included in production data.

The assembly process facility 730 receives the component and wiring information included in the production data and arranges the cut wiring duct 12 and DIN rail 13, the electronic component 14 and the busbar 15, which are finished products, in the enclosure, and displays connected information so that the wire wiring may be worked with the wire harness produced by the wire processing facility 720, so the workers may easily perform the assembling.

More preferably, the assembly process facility 730 may transmit the assembly information of the corresponding process to the worker through the digital work guide as shown in FIGS. 9 to 14.

The digital work guide includes a work bar 810, a work list 820, a 3D display unit 830, and a 3D adjusting unit 840.

As shown in FIGS. 9A to 14A, respectively, the work bar 810 indicates the current work process, the work list 820 is listed up for each work position to be worked in the current work process, and the 3D display unit 830 displays the information according to the selected work position as well as the overall image information of the corresponding process as a 3D image.

In addition, the 3D adjusting unit 840 allows a worker to easily check the 3D image, such as enlarging, reducing, or rotating the image displayed on the 3D display unit 830.

For example, when a worker selects any one item from the work list 820, as shown in FIGS. 9B to 14B, respectively, corresponding item information 821 is displayed for each position so the worker may easily check the selected item. According to the item of the task list 820 selected by the worker, a position 831 of the item selected in the image displayed on the 3D display unit 830 may be checked.

The digital work guide is divided by configuration of the power control panel, and FIG. 9 illustrate the enclosure, FIG. 10 illustrates the wiring duct, FIG. 11 illustrates the DIN rail, FIG. 12 illustrates the electrical component, FIG. 13 illustrates the bus bar, and FIG. 14 illustrates guiding an assembly process to a worker by outputting the work list and images required for wire wiring.

It is preferable to display the assembly information or component information for each process differently.

More preferably, the task list 820 displays at least one of the component information for each process, the component and electronic unit arrangement information, the assembly process information, and the wiring information regarding the configuration of the power control panel 10.

The assembly process guides the assembly using the digital work guide so that the processed component enclosure, the wiring duct, the DIN rail, the wire harnesses, and the busbar and electrical component which are the finished products may be collected and assembled.

FIG. 15 is a configuration diagram illustrating the production support system for power control panel production automation according to the embodiment of the present invention, and the production support system includes a production data generator 100, a server unit 200, and a client unit 300.

The production data generation unit 100 standardizes the component information of raw materials for each process required for the production of the power control panel 10 to generate the component data, interworks the component data with the 2D and 3D type component symbols to load the interworking component data through the 2D type component symbol and design the circuit, arranges and designs the components for each process in the power control panel 10 with the 3D type component symbol, and designates the assembly process.

In addition, the power control panel designed in the 3D type is implemented in the virtual environment, and the wiring path information of the designed component and electronic unit is simulated to generate the production data for each process including the component information for each process, the component and electronic unit arrangement information, the assembly process information, and the wiring information, by collecting the distributed information to support the production automation of the power control panel 10 designed in the 3D type which has been verified.

Here, the production data for each process means all information required for each process.

As the component information for the enclosure, the wiring duct, the DIN rail, the electrical component, the busbar, and the wire wiring, the enclosure includes a device tag, an item number, a component number, a component manufacturer, an item designation, and an door item, the wiring duct includes the device tag, the item number, the component number, the component manufacturer, the item designation, a depth, a width, a finger width, a slot width, and a length, the DIN rail includes the device tag, the item number, the component number, the component manufacturer, the item designation, the depth, a height, and the length, the electrical component includes the device tag, the item number, the component number, the component manufacturer, and the item designation, the busbar includes the device tag, the item number, the component number, the component manufacturer, the item designation, the depth, the width, and the length, and the wire wiring, includes a bundle group, a bundle number, bumper-buffing, a source device tag, a target device tag, a wire color, a wire cross-section area, a wire length, source terminal processing, target terminal processing, a wiring path, a source wiring direction, a target wiring direction, a connection type, a connection remark, a component number, a manufacturer, an object ID, and a connection index.

The server unit 200 uploads the production data for each process generated by the production data generation unit 100.

In this case, the server unit 200 stores production data in a storage unit 210 in various forms. That is, it includes project (*.zwl) including design information, digital work guide (*.epdz) for component assembly and wiring work in the assembly process, bill of material (BOM) (*.xlsx) including component information constituting the power control panel, PDF (*.pdf) for checking a design drawing, and AutomationML (*.ami) for interworking automation equipment.

In addition, the server unit 200 is designed to include a database 220 that has information on various types of power control panels 10, a web 3D engine 230 that renders 3D information for designing the power control panel in the 3D form to the client unit 300 that has requested the 3D information, and a web server 240 that may access the server 200 from the outside through the web.

The server unit 200 manages accounts of workers accessed from the client unit 300 through the database 220, and collects and manages production progress rates for each process.

The client unit 300 accesses the server 200, receives the production data according to a corresponding process, applies the received production data to the corresponding process, processes, cuts, and produces the component according to the production data, and guides the component assembly.

More specifically, the client unit 300 accesses the server 200 through the web browser or accesses to the server 200 with a device tag designated for each process to receive the production data.

The client unit 300 includes an enclosure processing unit 310, a wiring duct and DIN rail cutting unit 320, a wire processing unit 330, and an assembly processing unit 340.

The client unit 300 according to the embodiment of the present invention corresponds to the enclosure processing machine, the wiring duct and DIN rail cutting machine, the wire processing facility, and the assembly process facility of FIG. 7, respectively.

The enclosure processing unit 310 receives each component attachment information included in the production data and processes component attachment positions within the enclosure 11.

The wiring duct and DIN rail cutting unit 320 cuts the wiring duct 12 and the DIN rail 13 positioned in the enclosure 11 according to specifications.

The wire processing unit 330 facilitates the wiring work by producing and grouping the wire harnesses for the wire wiring.

The assembly process unit 340 guides the component assembly by displaying the work list for each process and the 3D image for the corresponding work through the digital work guide of the production data for each process.

In more detail, by receiving the component and wiring information included in the production data, the cut wiring duct 12 and DIN rail 13 and the electronic component 14 and the bus bar 15 which are finished products are disposed within the enclosure according to the digital work guide by receiving the component and wiring information included in the production data, and the wiring information is displayed as an image so that the wire wiring 16 may be worked with the wire harness produced in the wire processing unit 330, so the workers may easily perform the assembling.

As shown in FIG. 16, it is preferable that the assembly process unit 340 executes a browser, scans a web link or a QR code to access the server unit 200, logs in, and opens a project to sequentially perform the enclosure process, a wiring duct process, a DIN rail process, the electrical component process, the busbar process, and the wire wiring process.

Therefore, according to the present invention, it is possible to improve work efficiency regardless of a worker's career by sufficiently reflecting an intention of a designer in a production site and securing consistency of design drawings.

In addition, according to the present invention, it is possible to prevent human errors due to arbitrary interpretation of workers caused by work dependent on hard-copied drawing information, and it is possible to significantly reduce a labor force of workers and an error rate caused by incorrect input by automatically inputting raw material information required for each process.

Although the embodiments according to the present invention have been described, it is only an example. It will be understood by those skilled in the art that various modifications and equivalent other exemplary embodiments are possible from the present invention. Accordingly, a true technical scope of the present invention is to be determined by the spirit of the appended claims.

INDUSTRIAL APPLICABILITY

The present invention relates to a production support method and system for power control panel production automation that supports production of workers in order to improve productivity and work environment when producing a power control panel.

According to the present invention, it is possible to improve work efficiency regardless of a worker's career by sufficiently reflecting an intention of a designer in a production site and securing consistency of design drawings.

In addition, according to the present invention, it is possible to prevent human errors due to arbitrary interpretation of workers caused by work dependent on hard-copied drawing information, and it is possible to significantly reduce a labor force of workers and an error rate caused by incorrect input by automatically inputting raw material information required for each process.

The invention claimed is:

1. A production support method displaying information according to selected work position of an enclosure process, a wiring duct process, a DIN rail process, an electrical component process, a busbar process, and a wire wiring process which are assembly processes of power control panel as a 3D image for power control panel production automation, comprising:
generating component data by standardizing component information of raw materials required for the power control panel production;
interworking the component data with 2D and 3D type component symbols;
designing a circuit by loading component data interworking through the 2D type component symbol;
arranging and designing a component and an electronic unit inside the power control panel using the 3D type component symbol, and designating an assembly process;
implementing the power control panel designed in the 3D type in a virtual environment and verifying an error by simulating wiring path information of the designed component and electronic unit;
collecting distributed information to support the production automation of the power control panel designed in the 3D type, which has been verified, and extracting production data for each process including component information for each process, component and electronic unit arrangement information, assembly process information, and wiring information; and
automating production by applying the production data to each interworking production facility to support the production automation of the power control panel,
wherein the production data for each process comprises a project (*.zwl) format including design information, a bill of material (BOM) (*.xlsx) format including component information constituting the power control panel, a PDF (*.pdf) format for checking a design drawing, an AutomationML (*.ami) format for interworking automation equipment and a digital work guide format for component assembly and wiring work in the assembly process,
the digital work guide provides assembly information including at least any one of each component data, assembly position, assembly sequence, and assembly method to a worker by sequentially or selectively outputting the assembly processes of power control panel through an output device provided in an interworking production facility,
the digital work guide includes a work bar indicating current work process, a work list listed up for each work position to be worked in the current work process, a 3D display unit displaying information according to the selected work position as well as overall image information of corresponding process as the 3D image, and a 3D adjusting unit allowing the worker to check the 3D image by enlarging, reducing, or rotating the image displayed on the 3D display unit to guide the component assembly by displaying the work list for each process and the 3D image for corresponding process, and a door item of an enclosure in the 3D display unit displays a state in which the door is opened or excluded to check the internal components.

2. The production support method of claim 1, wherein the component information of the raw material comprises at least one of a component name, a model number, capacity information, a component manufacturer, a component specification, an outline drawing, an external dimension, and a function template (terminal number).

3. The production support method of claim 1, wherein as the production data for each process, the enclosure comprises a device tag, an item number, a component number, a component manufacturer, an item designation, and the door item,
- a wiring duct comprises the device tag, the item number, the component number, the component manufacturer, the item designation, a depth, a width, a finger width, a slot width, and a length,
- a DIN rail comprises the device tag, the item number, the component number, the component manufacturer, the item designation, the depth, a height, and the length,
- an electrical component comprises the device tag, the item number, the component number, the component manufacturer, and the item designation,
- a busbar comprises the device tag, the item number, the component number, the component manufacturer, the item designation, the depth, the width, and the length, and
- a wire wiring comprises a bundle group, a bundle number, bumper-buffing, a source device tag, a target device tag, a wire color, a wire cross-section area, a wire length, source terminal processing, target terminal processing, a wiring path, a source wiring direction, a target wiring direction, a connection type, a connection remark, a component number, a manufacturer, an object ID, and a connection index.

4. A production support system displaying information according to selected work position of an enclosure process, a wiring duct process, a DIN rail process, an electrical component process, a busbar process, and a wire wiring process which are assembly processes of power control panel as a 3D image for power control panel production automation, comprising:
- a production data generation unit that standardizes component information of raw materials for each process required for the power control panel production to generate component data, interworks the component data with 2D and 3D type component symbols, and loads the interlocked component data through the 2D type component symbol to design a circuit, arranges and designs a component and an electronic unit inside the power control panel with the 3D type component symbol, designates the assembly process, implements the power control panel designed in the 3D type in a virtual environment, simulates wiring path information of the designed component and electronic unit to verify an error, collects distributed information to support the production automation of the power control panel designed in the 3D type, which has been verified, and extracts production data for each process including component information for each process, component and electronic unit arrangement information, assembly process information, and wiring information;
- a server unit into which the production data for each process generated by the production data generation unit is uploaded; and
- a client unit that accesses a server, receives production data according to a corresponding process, applies the received production data to the corresponding process, processes, cuts, and produces the component according to the production data, and guides component assembly, wherein the production data for each process comprises a project (*.zwl) format including design information, a bill of material (BOM) (*.xlsx) format including component information constituting the power control panel, a PDF (*.pdf) format for checking a design drawing, an AutomationML (*.ami) format for interworking automation equipment and a digital work guide format for component assembly and wiring work in the assembly process, the digital work guide provides assembly information including at least any one of each component data, assembly position, assembly sequence, and assembly method to a worker by sequentially or selectively outputting the assembly processes of power control panel through an output device provided in an interworking production facility, the digital work guide includes a work bar indicating current work process, a work list listed up for each work position to be worked in the current work process, a 3D display unit displaying information according to the selected work position as well as overall image information of corresponding process as the 3D image, and a 3D adjusting unit allowing the worker to check the 3D image by enlarging, reducing, or rotating the image displayed on the 3D display unit to guide the component assembly by displaying the work list for each process and the 3D image for corresponding process, and a door item of an enclosure in the 3D display unit displays a state in which the door is opened or excluded to check the internal components.

5. The production support system of claim 4, wherein the client unit comprises an enclosure processing unit that receives each component attachment information and processes a component attachment position within the enclosure, a duct and DIN rail cutting unit that cuts a duct and DIN rail, a wire processing unit that produces a wire harness, and an assembly process unit that assembles processing, cutting, and produced power control panel components.

6. The production support system of claim 5, wherein the assembly process unit sequentially performs the enclosure process, the wiring duct process, the DIN rail process, the electrical component process, the busbar process, and the wire wiring process.

7. The production support system of claim 4, wherein the client unit accesses the server through a web browser or connects to the server with a device tag designated for each process to receive production data for each process.

* * * * *